(12) United States Patent
Hein et al.

(10) Patent No.: US 8,952,578 B2
(45) Date of Patent: Feb. 10, 2015

(54) MAGNETIC DEVICE

(75) Inventors: Jeremy Hein, Monaco (MC); Martin Marschner Von Helmreich, Monaco (MC)

(73) Assignee: SEH Limited, Mriehel BKR (MT)

( * ) Notice: Subject to any disclaimer, the term of this patent is extended or adjusted under 35 U.S.C. 154(b) by 225 days.

(21) Appl. No.: 13/600,709

(22) Filed: Aug. 31, 2012

(65) Prior Publication Data

US 2013/0057086 A1    Mar. 7, 2013

Related U.S. Application Data

(60) Provisional application No. 61/552,089, filed on Oct. 27, 2011.

(30) Foreign Application Priority Data

Sep. 5, 2011  (AT) ................................. A 1260/2011

(51) Int. Cl.
| | |
|---|---|
| *H02K 41/02* | (2006.01) |
| *H02K 33/16* | (2006.01) |
| *H01F 7/16* | (2006.01) |

(52) U.S. Cl.
CPC .............. *H02K 33/16* (2013.01); *H01F 7/1646* (2013.01); *H01F 2007/1692* (2013.01); *H02K 2201/03* (2013.01); *H02K 2213/03* (2013.01); *H02K 2213/09* (2013.01)
USPC ......................................... 310/12.19; 310/15

(58) Field of Classification Search
USPC ............................... 310/12.19, 13, 15, 19, 25
See application file for complete search history.

(56) References Cited

U.S. PATENT DOCUMENTS

| | | | | |
|---|---|---|---|---|
| 3,867,675 | A | * | 2/1975 | Kitz et al. ...................... 318/119 |
| 5,166,563 | A | * | 11/1992 | Bassine ............................ 310/15 |
| 5,175,455 | A | * | 12/1992 | Penicaut .................... 310/12.25 |
| 5,203,172 | A | * | 4/1993 | Simpson et al. ................ 60/545 |
| 2010/0027092 | A1 | * | 2/2010 | Van Os ....................... 359/223.1 |

* cited by examiner

*Primary Examiner* — Thanh Lam
(74) *Attorney, Agent, or Firm* — Hoffmann & Baron, LLP

(57) ABSTRACT

A magnetic device includes at least one stator and at least one translator. The translator is moveable in relation to the stator in a translator moving direction. The translator moves in a direction oriented towards the stator. The at least one stator and the translator are arranged along an axis. The magnetic device includes a control device, the control device includes a device for controlling a distance $r \geq 0$ (r being equal to or greater than 0) between the translator and the stator in relation to the force generated between the stator and the translator when the magnetic device is in operation. The translator is movable in relation to the stator in the translator moving direction along a linear translator movement axis. The at least one stator and the translator are oriented along the translator moving axis.

11 Claims, 22 Drawing Sheets

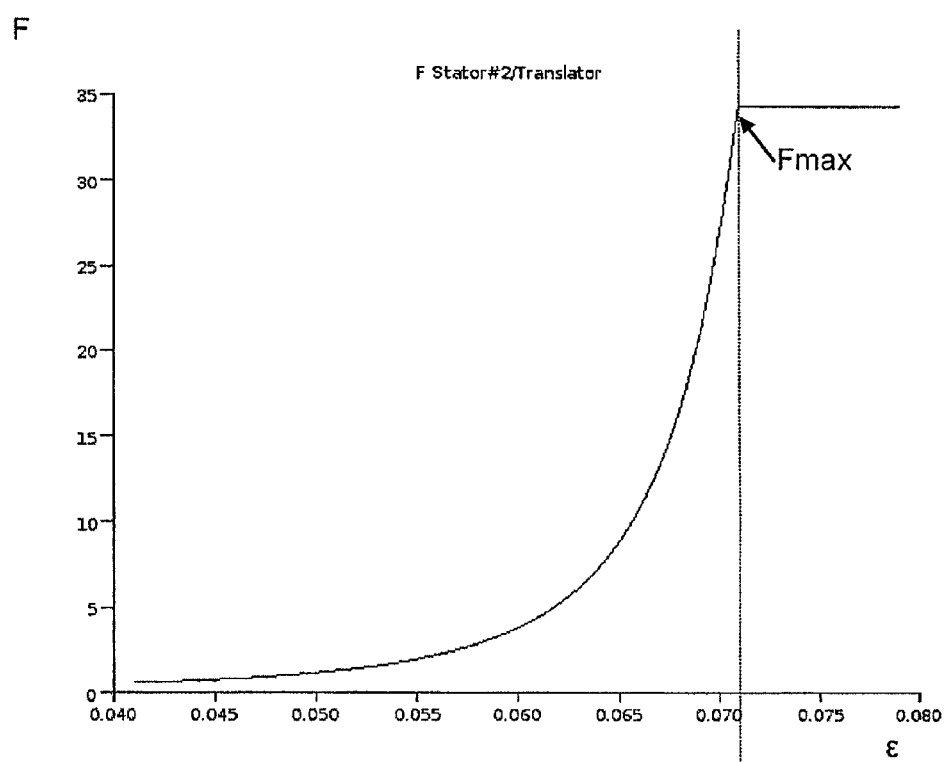
Figur 3b

MAGNETIC DEVICE

CROSS-REFERENCE TO RELATED APPLICATIONS

This application is a non-provisional of U.S. Provisional Patent Application No. 61/552,089, filed Oct. 27, 2011, which is incorporated herein by reference. This application also claims the benefit of Austrian Patent Application No. A 1260/2011, filed Sep. 5, 2011, which is incorporated herein by reference.

BACKGROUND

1. Field

The present invention relates to a magnetic device comprising at least one stator magnet and at least one translator magnet, said translator being movable in relation to said stator in a translator moving direction, said translator moving direction being oriented directionally towards the stator, said translator being further coupled to a driving axle.

2. Description of the Related Art

According to the state of the art, magnetic drives are based on the principle of utilizing the magnetic dipole. By activating repulsive and attractive forces, the translator is caused to move in relation to the stator magnet. This movement may consist in a directed, linear or rotary movement of the translator or an oscillating movement of the translator directed past the stator. Magnetic drives according to the state of the art, which are based on the latter kind of movement of the translator magnet, are marked by the fact that the translator and stator magnets are contacting each other at least in a final position. The translator in it's end position and the stator of a magnetic drive according to the State of the Art act as one magnet, thus high energy input is need to separate the stator and the translator.

JP2006325381 discloses a magnetic device having at least one translator which is movable between two stators, the moving axis of said translator extending through said stators. The movement of the translator is restricted by a spacer element provided on the stators. The spacer elements serve the purpose of reducing noises generated by the power generator and mechanical noises which are, for example, generated by the contact between the stator and the translator.

JP2006345652 describes a device for controlling the movement of a needle which is driven through a magnet. There is no evidence of the needle's movement being controlled in relation to the forces produced by a magnet.

US20060049701 shows a magnetic device in which the axis of movement of the translators does not extend through the stators. The translators are moved laterally along the stators, which results in the resulting forces between stators and translators not being parallel to the movements of the translators. Irrespective of the lack of an evidence concerning the control of the translators' movement in relation to the resulting forces between the translator and the stator, the device disclosed in US20060049701, due to the orientation of the forces in relation to the translators' movement, has a significantly lower efficiency than the device discussed below.

JP2010104078 describes a magnetic device in which the translator's movement is controlled by a spacer element. Said spacer element is formed in a way that it does not affect the forces between the stator and the translator.

RO126256 concerns a magnetic device which, contrary to the magnetic device discussed below, does not have a controlling device for controlling the translator's movement.

JP2002335662 discloses a magnetic device which does not comprise any controlling device for controlling the translator's movement, either.

SUMMARY

The task of the present invention consists in providing a magnetic device, especially a magnetic drive, a generator, or a resistance element, which are marked by a higher efficiency than the known electromagnetic motors according to the state of the art.

For reasons of simplification, the translator magnet will be referred to as translator below, while the stator magnet will be referred to as stator.

According to the invention, a higher efficiency is achieved by including a controlling device in the magnetic device, said controlling device comprising a device for controlling a distance r>0 (r being higher than 0) of the translator to the stator, when the magnetic device is in operation, in relation to the resulting forces between the stator and the translator, the translator being movable in relation to the stator in the translator's direction of movement along a linear translator movement axis, said at least one stator and said translator being oriented along said translator movement axis, wherein the minimum distance r is defined by a controlling unit based on the force created between the stator and the translator, so that a force acting on the translator at a Position $X_t$ of the translator is a maximum force, the force acting on the translator being defined by the following relation:

$$F_{repulsion}(X_t) = \frac{\mu_0}{4\pi} \left\{ \left( \frac{q_{s1a}(X_t)q_{tb}(X_t)}{\left(X_t + \frac{L_s + L_t}{2}\right)^2} + \frac{q_{s1b}(X_t)q_{ta}(X_t)}{\left(X_t - \frac{L_s + L_t}{2}\right)^2} \right) - \left( \frac{q_{s1a}(X_t)q_{ta}(X_t)}{\left(X_t + \frac{L_s - L_t}{2}\right)^2} + \frac{q_{s1b}(X_t)q_{tb}(X_t)}{\left(X_t + \frac{L_t - L_s}{2}\right)^2} \right) \right\}$$

wherein
$q_{s1a}(X_t)$ and $q_{s1b}(X_t)$ are the magnetic pole strengths of the stators,
$q_{ta}(X_t)$ and $q_{tb}(X_t)$ are the magnetic pole strengths of the translator, $$X_t \in ]\frac{L_s + L_t}{2}; \delta + \frac{L_s + L_t}{2}[$$

is the translator's position $X_t$,
$L_s$ is the length of the stators,
$L_t$ is the length of the translator.

If the translator and the stator are spaced apart by a distance r>0, as provided for by the invention, it is possible to prevent the translator and the stator from acting as one magnet.

In the framework of the present disclosure, the distance r is defined as the minimum distance between the translator surface facing the stator and stator surface facing the translator.

The stator and the translator may comprise a magnetic piece and a layer covering said magnetic piece or a separator preventing the establishment of a contact between the magnetic pieces of the stator and the translator, so that, if the distance r between stator and translator is 0, the magnetic pieces of stator and translator do not contact each other.

The control device can also make the distance r a function of the temporary properties of the magnets. On the one hand, the temporary properties of the magnets may change due to external influences, such as heat strain, and, on the other hand, they may be controlled by further control devices. The field strength of a magnetic field and the orientation of the magnet may, for example, be controlled by methods according to the state of the art. As established by current teachings, the selected materials and the combination of materials also have an influence on the properties of a magnet.

The control device which is part of the magnetic device of the invention can control the distance r, taking into account the above-mentioned influences and properties of the magnets of the at least one stator and the at least one translator.

In a trial installation, the minimum distance r amounted to 1.0 to 2.0 mm. The trial installation can be configured in a way that the distance is continuously adjustable, so that trials were carried out for every distance from 1.0 to 2.0 mm.

The axis along which the translator and the stator are arranged may be polygonal or may have curved and straight parts.

According to the established teachings, a stator and a translator act as one magnet, if they are brought into contact, also if only for a short time, or if the distance between them becomes just sufficiently small, so that, in order to obtain an oscillating movement of the translator, an additional separation energy would be required in order to separate the translator from the stator. Another task of the invention disclosed herein consists in providing a magnetic device which is characterized by making sure that the stator and the translator never contact each other when the magnetic device of the invention is in operation and, thus, following the established teachings, never act as one magnet during the operation of the magnetic device. This allows for an operation which does not required said additional separation energy when the translator is moved in a direction away from the stator.

The invention does not exclude a contact between the translator and the stator when the magnetic device of the invention is not in use.

If used as a magnetic drive, the magnetic device may be coupled to a centrifugal mass which is to be set in motion and which compensates a varying acceleration of the translator along the translator path. As an example, a flywheel according to the state of the art is mentioned herein.

The magnetic device according to the invention comprises at least one stator and a translator which can be moved in relation to said stator. One highly efficient embodiment of the magnetic device of the invention comprises two stators and a translator which is movably mounted between said two stators. If drives are to be arranged in series, the magnetic device of the invention may comprise a plurality of stators (n=1, 2, 3, . . . ) and n−1 translators which are mounted movably between said stators.

A possible embodiment of the magnetic device of the invention may comprise at least one stator, preferably two stators, disposed, for example, at the center of the axis and at least one translator, preferably two translators, disposed on the axis at both sides of the stator.

A magnetic device according to the invention may be combined with another magnetic device according to the invention and/or with a magnetic device according to the state of the art.

The movement of the translator in relation to the stator may be an oscillating movement.

The translator always oscillates in relation to a stator. The movement of the translator is caused by the attractive and repulsive forces generated by the magnetic dipole between the stator and the translator.

The use of the magnetic device of the invention as a magnetic drive may be characterized by an oscillating movement of the translator.

The oscillating movement of the translator may also be brought about by a system exercising a mechanical constraining force. By coupling the translator to a system exercising a mechanical constraining force, such as a crank mechanism, it becomes possible to limit the amplitudes of the translator's oscillating movement.

The system exercising a mechanical constraining force may balance the magnetic field strengths, which may be different or the same, and their influence on the translator's movement. The invention described below is based on trials using a trial device where magnets having different field strengths or magnets having the same field strengths were used. Experience with the use of magnets having the same field strengths for operating the trial device has been positive.

The system exercising a mechanical constraining force may force the translator to move further into an final position and, thus, move the translator out of the magnetic field of the closest stator against the attractive forces between one stator and the translator and the repulsive forces against one stator and the translator.

If the magnetic device of the invention is used as a resistance element, the translator remains at a defined distance to the stator for a defined period of time.

The following discussion deals with the generation of a magnetic polarization or magnetization of a material caused by a magnetic field H, which creates an additional magnetic field J. Furthermore, the distance of the translator to the stator in the final position of the translator's movement will be determined; the attractive and repulsive forces between the stator and the translator being maximal in this position.

The simplifications presented below are not intended to restrict the scope of the present invention in any way, but were only carried out for sake of a better understanding of the subject matter discussed herein.

Below, a magnetic drive will be contemplated, said magnetic drive comprising two stators arranged along one axis and a translator which is moveable mounted between said two stators to be movable along the axis. The stators and the translator are configured to be symmetrical in relation to said axis.

The ferromagnetic core is magnetized by magnetic excitation via the field H, which creates an additional magnetic field M. The magnetic fields M and H generate a magnetic field B, all magnetic fields in the equation being related to one another.

A magnetic field, magnetization, and a magnetic induction may generally be expressed by the equation 1.1.

$$B=\mu_0 H+J \tag{1.1}$$

wherein J is $$J=\mu_0 M \tag{1.2}$$

A combination of the equations (1.1) and (1.2) yields the following result:

$$B=\mu_0(H+M) \tag{1.3}$$

The volume magnetic susceptibility is defined by the following relationship:

$$M=\chi_v \times H \tag{1.4}$$

which yields the magnetic induction as a result of the magnetization's multiplication by the magnetic field strength $$B = \mu_0 H + J = \mu_0 (1 + \chi_v) H \quad (1.5)$$

or $$B = \mu_0 \mu_r H = \mu H \quad (1.6),$$

wherein $\mu_0 = 4\pi \times 10^{-7}$ H/m (Henry per meter) is the magnetic permeability of the space, $\chi_v$ is the volume magnetic susceptibility of the material, $\mu_r = 1 + \chi_v$ is the relative magnetic permeability of the material, $\mu = \mu_0 \times \mu_r$ is the absolute magnetic permeability of the material, B is the magnetic induction stated in tesla (T)

H is the magnetic field stated in amperes per meter (A/m)

J is the magnetization stated in tesla (T)

M is the magnetic dipole moment per volume unit stated in amperes per meter (A/m).

Below, a cylindrical stranded coil having a magnetic core will be contemplated, the cylindrical geometry resulting in a simplification according to the law of Biot and Savart.

O being the center of the cylindrical coil and (Ox) being the axis, the magnetic induction at a point M(x) on the axis (Ox), the following applies:

$$\begin{cases} \vec{B}(x)_{Ox} = \pm \| \vec{B}(x)_{Ox} \| \vec{e}_{OX} \\ \| \vec{B}(x)_{Ox} \| = \mu \frac{NI}{4a} \left\{ \frac{(x+a)}{\sqrt{(R^2 + (x+a)^2)}} - \frac{(x-a)}{\sqrt{(R^2 + (x-a)^2)}} \right\} \end{cases} \quad (2.1)$$

$\vec{e}_{OX}$ being the unit vector of the axis (Ox)

$\mu$ being the absolute magnetic permeability of the ferromagnetic core

N being the number of complete windings

L=2a being the length of the coil in meters (m)

R being the inner radius of the coil in meters (m)

I being the current intensity stated in amperes (A) within the coil

At the magnetic pole ends (x=−a and x=+a), the induction field strength according to Tesla is defined as follows:

$$B_0 = \| \vec{B}(x = \pm a)_{Ox} \| = \frac{\mu NI}{2\sqrt{(R^2 + (2a)^2)}} \quad (2.2)$$

Based on the equation (1.6), we are able to derive the magnetic field strength at the electromagnetic poles stated in amperes per meter:

$$H_0 = \| \vec{H}_M(x = \pm a)_{Ox} \| = \frac{NI}{2\sqrt{(R^2 + (2a)^2)}}, \quad (2.3)$$

the magnetic dipole moment in A/m resulting from the equations (1.4.) and (1.6.):

$$\begin{cases} \vec{M}_0 = \pm \| \vec{M}_0 \| \vec{e}_{OX} \\ \| \vec{M}_0 \| = \pm \chi_v \frac{B_0}{\mu} \vec{e}_{OX} = \pm \frac{\chi_v NI}{2\sqrt{(R^2 + L^2)}} \vec{e}_{OX} \end{cases} \quad (2.4)$$

Finally, the magnetic dipole moment may be expressed as follows:

$$\vec{m} = \vec{M}_0 V = \pm \frac{\chi_v NI \pi I^2 L}{2\sqrt{(R^2 + L^2)}} \vec{e}_{OX}, \quad (2.5)$$

$V = \pi R^2 L$ being known as the volume of the electromagnetic core.

According to the known Gilbert model the magnetic dipoles correspond to the two magnetic charges $+q_m$ and $-q_m$, said dipoles being separated by a distance L. The positive magnetic charge is linked to the north pole, while the negative magnetic charge is linked to the south pole.

The magnetic dipole moment is oriented from the south pole towards the north pole.

$$\vec{m} = \pm q_m L \vec{e}_{OX} \quad (2.6)$$

wherein $q_m$ is the size of the magnetic pole of the electromagnet in ammeters (A.m), L is the distance between the two magnetic poles in meters (m).

By combining the equations (2.5) and (2.6), the following equation is obtained $$q_m = \frac{\| \vec{M}_0 \| V}{L} = \frac{\chi_v NI \pi I^2}{2\sqrt{(R^2 + L^2)}} \quad (2.7)$$

wherein $q_m$ is the size of the magnetic pole of the electromagnet in ammeters (A.m), $\chi_v$ is the volume susceptibility of the material, N is the number of complete windings, L=2a is the length of the coil in meters (m), R is the inner radius of the coil in meters (m), I is the current intensity within the coil in amperes (A).

Below, an embodiment of the magnetic drive of the invention, which comprises three electromagnets arranged on one axis, the first and the second electromagnet being immovable and being referred to as stators below, will be discussed. The stators are arranged on an axis and spaced apart from one another by a distance d. In view of the present disclosure, the stators are sufficiently characterized by the following parameters.

$N_s$ is the number of windings of the coil forming the stator;

$L_s$ is the length of the stator in meters (m);

$R_s$ is the radius of the coil forming the stator in meters (m);

$I_s$ is the current intensity within the coil forming the stator in amperes (A);

$\chi_{vS}$ is the volume magnetic susceptibility of the ferromagnetic core of the stator; and $d = \| \vec{OO}_2 \|$ is the distance between the two stators.

The third magnet is disposed movably on the axis defined by the two stators and between the two stators. The third magnet will be referred to as translator below and is sufficiently characterized by the following parameters.

$N_t$ is the number of windings of the coil forming the translator;

$L_t$ is the length of the translator in meters (m);

$R_t$ is the radius of the coil forming the translator in meters (m);

$I_t$ is the current intensity within the coil forming the translator in amperes (A);

$\chi_{vT}$ is the volume magnetic susceptibility of the ferromagnetic core of the translator; and $\delta = d - L_s - L_t$, is the distance covered by the translator when moving between the two stators.

The stators are electrically connected to a d.c. source $+I_s$ and $-I_s$, which results in the absolute values of the magnetic poles being the same, the generated induction fields being oriented in opposite directions, however.

The polarization of the stators and the translator is to be selected in the way which those of skill in the art can discern in the FIGS. 1 and 2, in order to achieve a movement of the translator based on attractive and repulsive forces, which are described by the resulting force condition below.

The force condition resulting from a polarization of the stators and the translator according to FIG. 1 will be calculated below. The polarization of the translator shown in FIG. 1 is also referred to as "negative" polarization, meaning that the magnetic dipole moment $\vec{m}_t$ is oriented in the direction $-\vec{e}_{OX}$.

Based on the equation (2.5), the following applies:

$$\begin{cases} \vec{m}_{s1} = +\dfrac{\chi_{Vs} N_s I_s \pi R_s^2 L_s}{2\sqrt{(R_s^2 + L_s^2)}} \vec{e}_{OX} \\ \vec{m}_{s2} = -\dfrac{\chi_{Vs} N_s I_s \pi R_s^2 L_s}{2\sqrt{(R_s^2 + L_s^2)}} \vec{e}_{OX} \text{ and} \\ \vec{m}_t = -\dfrac{\chi_{Vt} N_t I_t \pi R_t^2 L_t}{2\sqrt{(R_t^2 + L_t^2)}} \vec{e}_{OX} \end{cases} \quad (3.1)$$

$$\begin{cases} q_{s1} = +\dfrac{\chi_{Vs} N_s I_s \pi R_s^2}{2\sqrt{(R_s^2 + L_s^2)}} \\ q_{s2} = -\dfrac{\chi_{Vs} N_s I_s \pi R_s^2}{2\sqrt{(R_s^2 + L_s^2)}} \\ q_t = -\dfrac{\chi_{Vt} N_t I_t \pi R_t^2}{2\sqrt{(R_t^2 + L_t^2)}} \end{cases} \quad (3.2)$$

Referring to the Gilbert model, it is assumed that, due to the interaction of magnetic charges, the magnetic forces generated between the magnets develop close to the poles of the magnetic dipole. The interacting forces between the magnetic poles are defined by the equation (3.3).

$$\vec{F} = \mu_0 \frac{q_a q_b}{4\pi r^2} \vec{e}_{OX} \quad (3.3)$$

wherein $q_i$ is the strength of the magnetic pole, and $r$ is the distance between the magnetic poles.

The interaction between the stators and the translator result in a force acting on the translator. This resulting force is oriented parallel to the (Ox) axis and in the direction $\vec{e}_{OX}$ (from left to right in FIG. 1).

Taking into account $\delta = r_1 + r_2 = d - L_s - L_t$ for the distance covered by the movement of the translator between the stators results in $$\begin{cases} r_1 = X_t - \dfrac{L_s + L_t}{2} \\ r_2 = \delta + \dfrac{L_s + L_t}{2} - X_t \end{cases}$$

wherein $$X_t \in \left] \frac{L_s + L_t}{2} ; \frac{L_s + L_t}{2} + \delta \right[$$

is the position of the translator center on the axis (Ox). Using the known Gilbert model, the resulting force may be calculated by adding the eight interactions between the magnetic poles.

If $-q_{s1} \Leftrightarrow +q_t$, the interaction of attraction between the left stator and the translator over a distance $L_s + r_1$ is defined by:

$$\begin{cases} \vec{F}_{s1ata}(r_1) = -\dfrac{\mu_0}{4\pi} \dfrac{q_{s1} q_t}{(L_s + r_1)^2} \vec{e}_{OX} \\ \vec{F}_{s1ata}(X_t) = -\dfrac{\mu_0}{4\pi} \dfrac{q_{s1} q_t}{\left(X_t + \dfrac{L_s - L_t}{2}\right)^2} \vec{e}_{OX} \end{cases}$$

$-q_{s1} \Leftrightarrow -q_t$: repulsive interaction, the distance being $L_s + r_1$ $$\begin{cases} \vec{F}_{s1atb}(r_1) = +\dfrac{\mu_0}{4\pi} \dfrac{q_{s1} q_t}{(r_1 + L_s + L_t)^2} \vec{e}_{OX} \\ \vec{F}_{s1atb}(X_t) = +\dfrac{\mu_0}{4\pi} \dfrac{q_{s1} q_t}{\left(X_t + \dfrac{L_s + L_t}{2}\right)^2} \vec{e}_{OX} \end{cases}$$

$+q_{s1} \Leftrightarrow +q_t$: repulsive interaction, the distance being $r_1$:

$$\begin{cases} \vec{F}_{s1bta}(r_1) = +\dfrac{\mu_0}{4\pi} \dfrac{q_{s1} q_t}{r_1^2} \vec{e}_{OX} \\ \vec{F}_{s1bta}(X_t) = +\dfrac{\mu_0}{4\pi} \dfrac{q_{s1} q_t}{\left(X_t - \dfrac{L_s - L_t}{2}\right)^2} \vec{e}_{OX} \end{cases}$$

$+q_{s1} \Leftrightarrow -q_t$: attractive forces, the distance being $r_1 + L_t$:

$$\begin{cases} \vec{F}_{s1btb}(r_1) = -\dfrac{\mu_0}{4\pi} \dfrac{q_{s1} q_t}{(r_1 + L_t)^2} \vec{e}_{OX} \\ \vec{F}_{s1btb}(X_t) = -\dfrac{\mu_0}{4\pi} \dfrac{q_{s1} q_t}{\left(X_t + \dfrac{L_t - L_s}{2}\right)^2} \vec{e}_{OX} \end{cases}$$

If $+q_{s2} \Leftrightarrow +q_t$, the interaction of repulsion between the right stator and the translator over a distance $L_t+r_2$ is defined by:

$$\begin{cases} \vec{F}_{s2ata}(r_2) = -\dfrac{\mu_0}{4\pi} \dfrac{q_{s2}q_t}{(r_2+L_t)^2}\vec{e}_{OX} \\ \vec{F}_{s2ata}(X_t) = -\dfrac{\mu_0}{4\pi} \dfrac{q_{s2}q_t}{\left(\delta + \dfrac{L_s}{2} + \dfrac{3L_t}{2} - X_t\right)^2}\vec{e}_{OX} \end{cases}$$

$+q_{s1} \Leftrightarrow -q_t$: attractive forces, the distance being $r_2$:

$$\begin{cases} \vec{F}_{s2atb}(r_2) = +\dfrac{\mu_0}{4\pi} \dfrac{q_{s2}q_t}{r_2^2}\vec{e}_{OX} \\ \vec{F}_{s2atb}(X_t) = +\dfrac{\mu_0}{4\pi} \dfrac{q_{s2}q_t}{\left(\delta + \dfrac{L_s+L_t}{2} - X_t\right)^2}\vec{e}_{OX} \end{cases}$$

$-q_{s2} \Leftrightarrow +q_t$: attractive forces, the distance being $L_s+r_2+L_t$:

$$\begin{cases} \vec{F}_{s2bta}(r_2) = +\dfrac{\mu_0}{4\pi} \dfrac{q_{s2}q_t}{(r_2+L_s+L_t)^2}\vec{e}_{OX} \\ \vec{F}_{s2bta}(X_t) = +\dfrac{\mu_0}{4\pi} \dfrac{q_{s2}q_t}{\left(\delta + 3\dfrac{L_s+L_t}{2} - X_t\right)^2}\vec{e}_{OX} \end{cases}$$

$-q_{s2} \Leftrightarrow -q_t$: repulsive forces, the distance being $r_2+L_s$:

$$\begin{cases} \vec{F}_{s2btb}(r_2) = -\dfrac{\mu_0}{4\pi} \dfrac{q_{s2}q_t}{(r_2+L_s)^2}\vec{e}_{OX} \\ \vec{F}_{s2btb}(X_t) = -\dfrac{\mu_0}{4\pi} \dfrac{q_{s2}q_t}{\left(\delta + \dfrac{3L_s}{2} + \dfrac{L_t}{2} - X_t\right)^2}\vec{e}_{OX} \end{cases}$$

The resulting force acting on the translator is defined as the vectorial sum of all interactions:

$$\vec{F}_{TOT}(X_t) = \sum_{\substack{i=a,b \\ j=a,b}} \vec{F}_{s1ij}(X_t) + \sum_{\substack{i=a,b \\ j=a,b}} \vec{F}_{s2ij}(X_t) \quad (3.4)$$

$$\vec{F}_{TOT}(X_t) = \dfrac{\mu_0 q_t}{4\pi}\left\{\begin{array}{l} \dfrac{q_{s1}}{\left(X_t + \dfrac{L_s+L_t}{2}\right)^2} \\ + \dfrac{q_{s1}}{\left(X_t - \dfrac{L_s+L_t}{2}\right)^2} \\ + \dfrac{q_{s2}}{\left(\delta + \dfrac{L_s+L_t}{2} - X_t\right)^2} \\ + \dfrac{q_{s2}}{\left(\delta + 3\dfrac{L_s+L_t}{2} - X_t\right)^2} \end{array}\right\} -$$

$$\left\{\begin{array}{l} + \dfrac{q_{s1}}{\left(X_t + \dfrac{L_s-L_t}{2}\right)^2} \\ + \dfrac{q_{s1}}{\left(X_t + \dfrac{L_t-L_s}{2}\right)^2} \\ + \dfrac{q_{s2}}{\left(\delta + \dfrac{L_s}{2} + \dfrac{3L_t}{2} - X_t\right)^2} \\ + \dfrac{q_{s2}}{\left(\delta + \dfrac{3L_s}{2} + \dfrac{L_t}{2} - X_t\right)^2} \end{array}\right\}\vec{e}_{OX}$$

wherein:

$$X_t \in \left]\dfrac{L_s+L_t}{2};\, \delta + \dfrac{L_s+L_t}{2}\right[$$

defines the translator's position
$\delta = d - L_s - L_t$ defines the distance covered by the translator $$\begin{cases} q_{s1} = \dfrac{\chi V_s N_s I_s \pi R_s^2}{2\sqrt{(R_s^2+L_s^2)}} \\ q_{s2} = \dfrac{\chi V_s N_s I_s \pi R_s^2}{2\sqrt{(R_s^2+L_s^2)}} \\ q_t = \dfrac{\chi V_t N_t I_t \pi R_t^2}{2\sqrt{(R_t^2+L_t^2)}} \end{cases}$$

Moreover, the force resulting from the polarization of the stators and the translator as shown in FIG. 2 is calculated. The polarization of the translator shown in FIG. 2 is also referred to as "positive" polarization, meaning that the magnetic dipole moment $\vec{m}_t$ is oriented in the direction $\vec{e}_{OX}$.

The equations (3.1) and (3.2) combined result in equation (3.2'):

$$\begin{cases} \vec{m}_{s1} = +\dfrac{\chi V_s N_s I_s \pi R_s^2 L_s}{2\sqrt{(R_s^2+L_s^2)}}\vec{e}_{OX} \quad (3.1') \\ \vec{m}_{s2} = +\dfrac{\chi V_s N_s I_s \pi R_s^2 L_s}{2\sqrt{(R_s^2+L_s^2)}}\vec{e}_{OX} \\ q_{s1} = \dfrac{\chi V_s N_s I_s \pi R_s^2}{2\sqrt{(R_s^2+L_s^2)}} \quad (3.2') \\ \vec{m}_t = 2\dfrac{\chi V_t N_t I_t \pi R_t^2 L_t}{2\sqrt{(R_t^2+L_t^2)}}\vec{e}_{OX} \\ q_{s2} = \dfrac{\chi V_s N_s I_s \pi R_s^2}{2\sqrt{(R_s^2+L_s^2)}} \\ \text{and} \\ q_t = \dfrac{\chi V_t N_t I_t \pi R_t^2}{2\sqrt{(R_t^2+L_t^2)}} \end{cases}$$

With $\vec{F}_{xxx}(X_t)'$ being the force resulting from the interaction between stators and translators if the translator is polarized according to FIG. 1, and $\vec{F}_{xxx}(X_t)$ being the analogous force if the translator is polarized according to FIG. 2, the following relationships concerning the interaction between the two poles are defined:

$$\begin{cases} \vec{F}_{s1ata}(X_t)' = -\vec{F}_{s1ata}(X_t) \\ \vec{F}_{s1atb}(X_t)' = -\vec{F}_{s1atb}(X_t) \\ \vec{F}_{s1bta}(X_t)' = -\vec{F}_{s1bta}(X_t) \\ \vec{F}_{s1btb}(X_t)' = -\vec{F}_{s1btb}(X_t) \end{cases}$$

and $$\begin{cases} \vec{F}_{s2ata}(X_t)' = -\vec{F}_{s2ata}(X_t) \\ \vec{F}_{s2atb}(X_t)' = -\vec{F}_{s2atb}(X_t) \\ \vec{F}_{s2bta}(X_t)' = -\vec{F}_{s2bta}(X_t) \\ \vec{F}_{s2btb}(X_t)' = -\vec{F}_{s2btb}(X_t) \end{cases},$$

which means that $$\vec{F}_{TOT}(X_t)' = \sum_{\substack{i=a,b \\ j=a,b}} \vec{F}_{s1itj}(X_t)' + \sum_{\substack{i=a,b \\ j=a,b}} \vec{F}_{s2itj}(X_t)' =$$

$$-\left\{ \sum_{\substack{i=a,b \\ j=a,b}} \vec{F}_{s1itj}(X_t) + \sum_{\substack{i=a,b \\ j=a,b}} \vec{F}_{s2itj}(X_t) \right\} = -\{\vec{F}_{TOT}(X_t)\}$$

If $N_x$ is the number of windings of coil forming the translator or the stator, $L_x$ is the length of the stator or the translator in meters (m), $R_x$ is the radius of the stator or the translator in meters (m), $I_x$ is the current intensity in amperes (A) within the coil forming the translator or the stator, $\chi_{vx}$ is the magnetic susceptibility of the ferromagnetic core of the stator or the translator, the stator #1 is polarized, so that $\vec{m}_{s1} = -\|\vec{m}_{s1}\|\vec{e}_{OX}$ applies, the stator #2 is polarized, so that $\vec{m}_{s2} = +\|\vec{m}_{s2}\|\vec{e}_{OX}$ applies, the following applies for the conditions shown in FIG. 1.

$$\vec{F}_{TOT}(X_t) = \quad (3.6)$$

$$\frac{\mu_0 q_t}{4\pi} \left\{ \left( \begin{array}{c} \frac{q_{s1}}{\left(X_t + \frac{L_s + L_t}{2}\right)^2} + \\ \frac{q_{s1}}{\left(X_t - \frac{L_s + L_t}{2}\right)^2} + \\ \frac{q_{s2}}{\left(\delta + \frac{L_s + L_t}{2} - X_t\right)^2} + \\ \frac{q_{s2}}{\left(\delta + 3\frac{L_s + L_t}{2} - X_t\right)^2} \end{array} \right) - \left( \begin{array}{c} + \frac{q_{s1}}{\left(X_t + \frac{L_s - L_t}{2}\right)^2} \\ + \frac{q_{s1}}{\left(X_t + \frac{L_t - L_s}{2}\right)^2} \\ + \frac{q_{s2}}{\left(\delta + \frac{L_s}{2} + \frac{3L_t}{2} - X_t\right)^2} \\ + \frac{q_{s2}}{\left(\delta + \frac{3L_s}{2} + \frac{L_t}{2} - X_t\right)^2} \end{array} \right) \right\} \vec{p}_{translator}$$

wherein $\vec{p}_{translator} = \pm \vec{e}_{OX}$ is the direction of the magnetic dipole moment of the translator ($\vec{m}_t = \|\vec{m}_t\|\vec{p}_{translator}$). This direction is determined by the a.c. voltage $I_t$ within the translator.

$$\begin{cases} q_{s1} = \frac{\chi_{Vs} N_s I_s \pi R_s^2}{2\sqrt{(R_s^2 + L_s^2)}} \\ q_{s2} = \frac{\chi_{Vs} N_s I_s \pi R_s^2}{2\sqrt{(R_s^2 + L_s^2)}} \\ q_t = \frac{\chi_{Vt} N_t I_t \pi R_t^2}{2\sqrt{(R_t^2 + L_t^2)}} \end{cases}$$

are the magnetic pole strengths, $$X_t \in \left]\frac{L_s + L_t}{2}; \delta + \frac{L_s + L_t}{2}\right[$$

is the translator position, $\delta = d - L_s - L_t$ is the distance covered by the translator, $d = \|\vec{OO_2}\|$ is the preset distance between the stators.

If the electromagnets are of the same length, i.e. $L_s = L_t = L$, the equation (3.6) can be simplified as follows:

$$\vec{F}_{TOT}(X_t) = \quad (3.7)$$

$$\frac{\mu_0 q_t}{4\pi} \left\{ \left( \begin{array}{c} \frac{q_{s1}}{(X_t + L)^2} + \\ \frac{q_{s1}}{(X_t - L)^2} + \\ \frac{q_{s2}}{(\delta + L - X_t)^2} + \\ \frac{q_{s2}}{(\delta + 3L - X_t)^2} \end{array} \right) - \left( \begin{array}{c} + \frac{2q_{s1}}{X_t^2} \\ + \frac{2q_{s2}}{(\delta + 2L - X_t)^2} \end{array} \right) \right\} \vec{p}_{translator}$$

For the discussion below it is assumed, for reasons of simplicity, that the pole strengths of the magnets are constant, although, in reality, the magnetic induction field (Ox) develops when the translator moves between the stators.

The equation (4.1a) applies.

$$\vec{B}_{TOT}(X_t,x)_{Ox} = \vec{B}_{s1}(x)_{Ox} + \vec{B}_{s2}(x)_{Ox} + \vec{B}_t(X_t,x)_{Ox} \quad (4.1a) \text{ wherein}$$

$\vec{B}_{TOT}(X_t,x)_{Ox}$ is the total induction field on the (Ox) axis at a position x, when the translator has reached the position $X_t$, $\vec{B}_{s1}(x)_{Ox}$ is the induction field of the first stator on the (Ox) axis at a position x, $\vec{B}_{s2}(x)_{Ox}$ is the induction field of the second stator on the (Ox) axis at a position x, $\vec{B}_t(X_t,x)_{Ox}$ is the induction field of the translator on the (Ox) axis at a position $X_t$.

The size of the magnetic induction field was defined by the equation (2.1), from which the size of the magnetic induction field between the first stator and the translator can be derived.

$$\|\vec{B}_{s1}(x)_{Ox}\| = \quad (4.1b)$$

$$\mu_{s1} \frac{N_{s1} I_{s1}}{4 a_{s1}} \left\{ \frac{(x + a_{s1})}{\sqrt{(R_{s1}^2 + (x + a_{s1})^2)}} - \frac{(x - a_{s1})}{\sqrt{(R_{s1}^2 + (x - a_{s1})^2)}} \right\}$$

-continued $$\|\vec{B}_{s2}(x')_{O2x}\| =$$

$$\mu_{s2}\frac{N_{s2}I_{s2}}{4a_{s2}}\left\{\frac{(x'+a_{s2})}{\sqrt{(R_{s2}^2+(x'+a_{s2})^2)}}-\frac{(x'-a_{s2})}{\sqrt{(R_{s2}^2+(x'-a_{s2})^2)}}\right\}$$

$$\|\vec{B}_t(x'')_{Tx}\| = \mu_t\frac{N_tI_t}{4a_t}\left\{\frac{(x''+a_t)}{\sqrt{(R_t^2+(x''+a_t)^2)}}-\frac{(x''-a_t)}{\sqrt{(R_t^2+(x''-a_t)^2)}}\right\}$$

wherein x is the position on the axis (Ox) for which $\|\vec{B}_{s1}(x)_{Ox}\|$ is calculated, x' is the position on the axis ($O_2x$) for which $\|\vec{B}_{s2}(x')_{O2x}\|$ is calculated, x" is the position on the axis (Tx) for which $\|\vec{B}_t(x'')_{Tx}\|$ is calculated.

If $$\begin{cases}\vec{O}_2M = \vec{O}_20 + \vec{0}M \\ \vec{T}M = \vec{T}0 + \vec{0}M\end{cases}$$

and applying the variable changes $$\begin{cases}x' = x - d \\ x'' = x - X_t\end{cases},$$

$\|\vec{B}_{s2}(x)_{Ox}\|$ and $\|\vec{B}_{s2}(x)_{Ox}\|$ can be expressed as follows:

$$\|\vec{B}_{s1}(x)_{Ox}\| = \qquad (4.2a)$$

$$\mu_{s1}\frac{N_{s1}I_{s1}}{4a_{s1}}\left\{\frac{(x+a_{s1})}{\sqrt{(R_{s1}^2+(x+a_{s1})^2)}}-\frac{(x-a_{s1})}{\sqrt{(R_{s1}^2+(x-a_{s1})^2)}}\right\}$$

$$\|\vec{B}_{s2}(x)_{Ox}\| = \mu_{s2}\frac{N_{s2}I_{s2}}{4a_{s2}}$$

$$\left\{\frac{(x-d+a_{s2})}{\sqrt{(R_{s2}^2+(x-d+a_{s2})^2)}}-\frac{(x-d-a_{s2})}{\sqrt{(R_{s2}^2+(x-d-a_{s2})^2)}}\right\}$$

$$\|\vec{B}_t(X_t,x)_{Ox}\| = \mu_t\frac{N_tI_t}{4a_t}\left\{\frac{(x-X_t+a_t)}{\sqrt{(R_t^2+(x-X_t+a_t)^2)}}-\right.$$

$$\left.\frac{(x-X_t-a_t)}{\sqrt{(R_t^2+(x-X_t-a_t)^2)}}\right\}$$

On the (Ox) axis, the induction field is oriented in the same direction as the magnetic dipole moment. Taking:

$$\vec{B}_{TOT}(X_t,x)_{Ox} = \{\|\vec{B}_{s1}(x)_{Ox}\| - \|\vec{B}_{s2}(x)_{Ox}\|\}\vec{e}_{Ox} +$$

$$\vec{B}_t(X_t,x)_{Ox}\|\vec{p}_t \qquad (4.2b)$$

wherein $\vec{e}_{OX}$ is the unit vector in the direction of the axis (Ox)

$\vec{p}_{translator} = \pm\vec{e}_{OX}$ is the direction of the magnetic dipole moment of the translator, into consideration, this yields:

$$(\vec{m}_t = \|\vec{m}_t\|\vec{p}_{translator}).$$

The direction is determined by the direction of the a.c. voltage $I_t$ within the translator. A combination of the equations (1.4), (1.6), and (2.5) results in:

$$q_m = \frac{\|\vec{M}\|V}{L} = \|\vec{M}\|\pi R^2 = \frac{\chi_v}{\mu}\pi R^2\|\vec{B}\| = \frac{\mu_r-1}{\mu_0\mu_r}\pi R^2\|\vec{B}\| \qquad (4.3a)$$

As the following applies:

stator #1:
$$\begin{cases}q_{s1a}(X_t) = \frac{\mu_{Rs}-1}{\mu_0\mu_{Rs}}\pi R_s^2\|\vec{B}_{TOT}(X_t,x=-a_s)\| \\ q_{s1b}(X_t) = \frac{\mu_{Rs}-1}{\mu_0\mu_{Rs}}\pi R_s^2\|\vec{B}_{TOT}(X_t,x=+a_s)\|\end{cases} \qquad (4.4a)$$

stator #2:
$$\begin{cases}q_{s2a}(X_t) = \frac{\mu_{Rs}-1}{\mu_0\mu_{Rs}}\pi R_s^2\|\vec{B}_{TOT}(X_t,x=d-a_s)\| \\ q_{s2b}(X_t) = \frac{\mu_{Rs}-1}{\mu_0\mu_{Rs}}\pi R_s^2\|\vec{B}_{TOT}(X_t,x=d+a_s)\|\end{cases} \qquad (4.4b)$$

translator:
$$\begin{cases}q_{ta}(X_t) = \frac{\mu_{Rt}-1}{\mu_0\mu_{Rt}}\pi R_t^2\|\vec{B}_{TOT}(X_t,x=X_t-a_s)\| \\ q_{tb}(X_t) = \frac{\mu_{Rt}-1}{\mu_0\mu_{Rt}}\pi R_t^2\|\vec{B}_{TOT}(X_t,x=X_t+a_s)\|\end{cases} \qquad (4.4c)$$

Equation (3.6) is transformed into:

$$\vec{F}_{TOT}(X_t) = \qquad (4.5)$$

$$\frac{\mu_0}{4\pi}\left\{\left\{\frac{q_{s1a}(X_t)q_{tb}(X_t)}{\left(X_t+\frac{L_s+L_t}{2}\right)^2}+\frac{q_{s1b}(X_t)q_{ta}(X_t)}{\left(X_t-\frac{L_s+L_t}{2}\right)^2}+\frac{q_{s2a}(X_t)q_{tb}(X_t)}{\left(\delta+\frac{L_s+L_t}{2}-X_t\right)^2}+\frac{q_{s2b}(X_t)q_{ta}(X_t)}{\left(\delta+3\frac{L_s+L_t}{2}-X_t\right)^2}\right\}-\left\{\frac{q_{s1a}(X_t)q_{ta}(X_t)}{\left(X_t+\frac{L_s-L_t}{2}\right)^2}+\frac{q_{s1b}(X_t)q_{tb}(X_t)}{\left(X_t+\frac{L_t-L_s}{2}\right)^2}+\frac{q_{s2a}(X_t)q_{ta}(X_t)}{\left(\delta+\frac{L_s}{2}+\frac{3L_t}{2}-X_t\right)^2}+\frac{q_{s2b}(X_t)q_{tb}(X_t)}{\left(\delta+\frac{3L_s}{2}+\frac{L_t}{2}-X_t\right)^2}\right\}\right\}\vec{p}_{translator}$$

wherein:

$$X_t \in\left]\frac{L_s+L_t}{2};\delta+\frac{L_s+L_t}{2}\right[$$

is the position of the translator, $\delta = d - L_s - L_t$ is the distance covered by the translator's movement, $d = \|\vec{OO}_2\|$ is the distance between the stators' centers.

The magnetic pole strengths are calculated using equation (4.4a) for the first stator, equation (4.4b) for the second stator, and equation (4.4c) for the translator. The calculation of the magnetic pole strengths includes the calculation of the total magnetic induction field at the poles using the equations (4.2a) and (4.2b).

The equation (4.5) is a function depending on the translator's position between the stators. The resulting force acting on the translator consists of the repulsive force between the first stator and the translator and the attractive force between the second stator and the translator. The dependences of each of said forces are shown in the appended FIGS. 3a, 3b, 3c.

The above mathematic explanation also shows that, at a certain position of the translator in relation to a stator, the attractive force and, after reversing the poles of the stator and the translator, the repulsive force are of different magnitudes.

The magnetic device of the invention is based on the fact that the polarization of the stator or translator creates a force acting on the translator and causing it to move.

One embodiment of the magnetic device of the present invention may comprise a stator formed of a permanent magnet and a translator formed of an electromagnet.

When using a magnetic device of the invention according to this embodiment as a magnetic drive, one drawback consists in that at least some sections of a cable connecting the translator to a power supply will be moved. When using n=1, 2, 3, . . . stators and n−1 translators disposed between said stators, the fact that the translators are electromagnets, however, causes the poles of the n−1 translators to be changed to become less than the n stators.

In another embodiment of the magnetic device of the present invention the stator may be an electromagnet, while the translator is a permanent magnet.

When using the magnetic device of the invention as a magnetic drive, this embodiment is characterized by the fact that the stator, being a stationary magnet, is couples to a power supply. This has the advantage that the cables connecting the power supply and the stator are not moved. When using n=1, 2, 3, . . . stators and n−1 translators disposed between said stators, the fact that the stators are electromagnets, however, causes the poles of the n stators to be changed to become more than the n−1 translators.

Both stator and translator may be electromagnets or permanent magnets.

In case of the use as resistance element, both the at least one stator and the translator are permanent magnets. In this case, the stator's movement is restricted by activating repulsive forces between the poles of the same sign of the stator and the translator.

In a possible embodiment of the magnetic device of the invention, the stator may consist of several individual stator magnets and/or the translator may consist of several individual translator magnets.

The individual magnets are preferably disposed in a way that greater attractive and repulsive forces between the stators and the translator may be generated by superpositioning the individual magnetic fields.

The control device may comprise a spacer element disposed between the stator and the translator and/or a system exercising a mechanical constraining force restraining the translator's movement.

The spacer element may comprise a switch which is activated by a change of the poles of the stator and/or the translator and/or by a change of the pole strengths of the stator or the translator.

The control device may comprise a distance and/or time measuring device, the polarization of the stator and/or translator and/or the field strength of the stator and/or the translator being changeable depending on the position of the translator in relation to the stator and/or depending on a period of time using said control device.

One embodiment of the magnetic device of the present invention comprises at least one control unit controlling the position of the translator in relation to the stator. This control device is coupled to a position measuring device measuring the position of the translator, optionally in relation to the stator, by means of measuring methods, particularly distance and position measuring methods according to the state of the art, and optionally determining the polarization of the stator and the translator based on the translator's position in relation to the stator.

The control device is not restricted to measuring a certain position of the translator nor to determining if the translator has reached a certain position. The control device may comprise further devices, such as position or velocity measuring devices for measuring the position of the translator or the velocity of the translator at any of its positions.

Measuring the position and the velocity of the translator at any position may be advantageous for controlling the movement of the translator at a defined distance from the stator, especially when the velocity of the translator is high, as the translator has to be slowed down or accelerated at a certain distance from the stator.

The translator's position is not determined merely by measuring a position of the translator in relation to the stator. The translator's position can be determined in relation to any reference point.

Another embodiment of the magnetic device of the present invention is characterized by the translator being coupled to a system exercising a mechanical constraint on it, such as a crankshaft, said system controlling the translator's movement, more exactly the movement amplitudes of the translator, while maintaining the distance between the translator and the stator. The system exercising a mechanical constraint may be coupled to or formed as an element to be driven by the magnetic device of the invention, such as a wheel.

In case of a linear movement of the translator, the individual stator magnets at the stator and/or the individual translator magnets at the translator may be arranged along a line describing a polygon and around an axis which is oriented parallel to the translator's moving direction.

The translator's moving direction and the attractive and repulsive forces activated by the respective magnetic fields are parallel to one another.

In case of a rotary movement of the translator, the individual stator magnets at the stator and/or the individual translator magnets at the translator may be arranged along a line describing a polygon and around an axis which is oriented parallel to the translator's moving direction.

The translator's moving direction and the attractive and repulsive forces activated by the respective magnetic fields are parallel to one another.

The translator may be mounted movably in relation to the stator by means of a guiding unit, the guiding axle of said guiding unit intersecting the stator in an area between two adjacent individual stator magnets and the translator in an area between two adjacent individual translator magnets.

When the guiding unit is arranged according to the invention, the magnetic field of the respective individual magnets will not be disturbed by the presence of the guiding unit.

A volume extending between the stator and the translator, when said translator is positioned at the furthest distance d in relation to the stator, may be a vacuum.

By creating a vacuum or an area of reduced air pressure according to the invention, the air resistance acting against the translator's movement is reduced. In order to create a vacuum, the magnetic device of the present invention is disposed within an air-tight housing, the driving axle, the power cable, etc running through said housing.

1 stator
2 translator
3 driving axle
4 individual stator magnets
5 individual translator magnets
6 direction of the translator's movement
7 guiding unit
8 guiding axle
9 axis
10 polygon
11 power cable
12 attractive force
13 repulsive force
14 stator support
15 support construction
16 position of the stator
17 disc
18 center of the disc
19,19' rod
20,20' magnetic drive
21 calculation area
22 core
23 coil

BRIEF DESCRIPTION OF THE DRAWINGS

The FIGS. 1 and 2 show an embodiment of the magnetic device of the invention as a magnetic drive 20 and all the variables used in the specification.

The FIGS. 3a-3c show graphs relating to the magnitude of the forces acting on the translator as depending on the distance of the translator's position to the stators.

Figure 4:
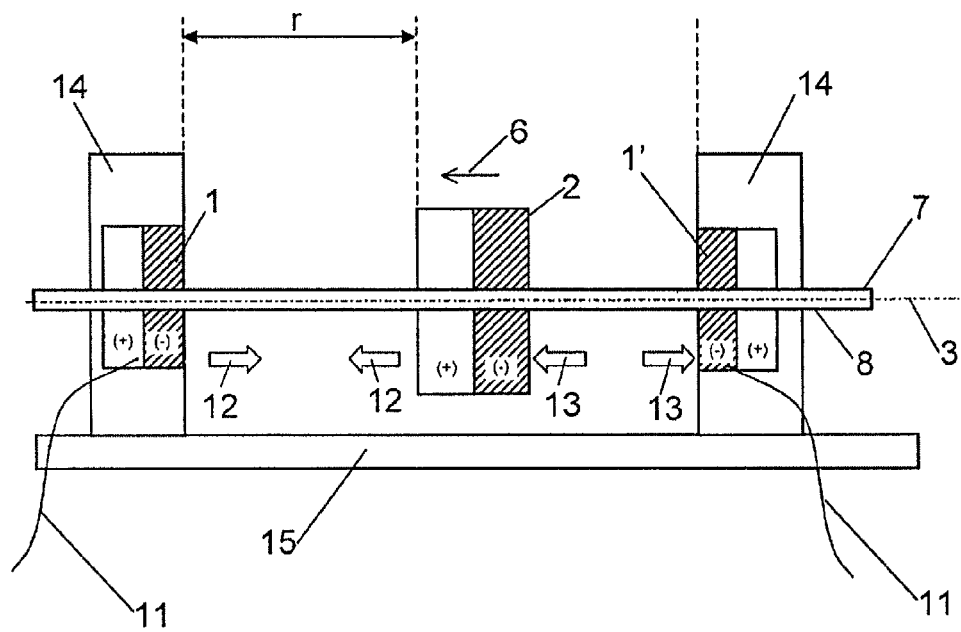
Figure 5:
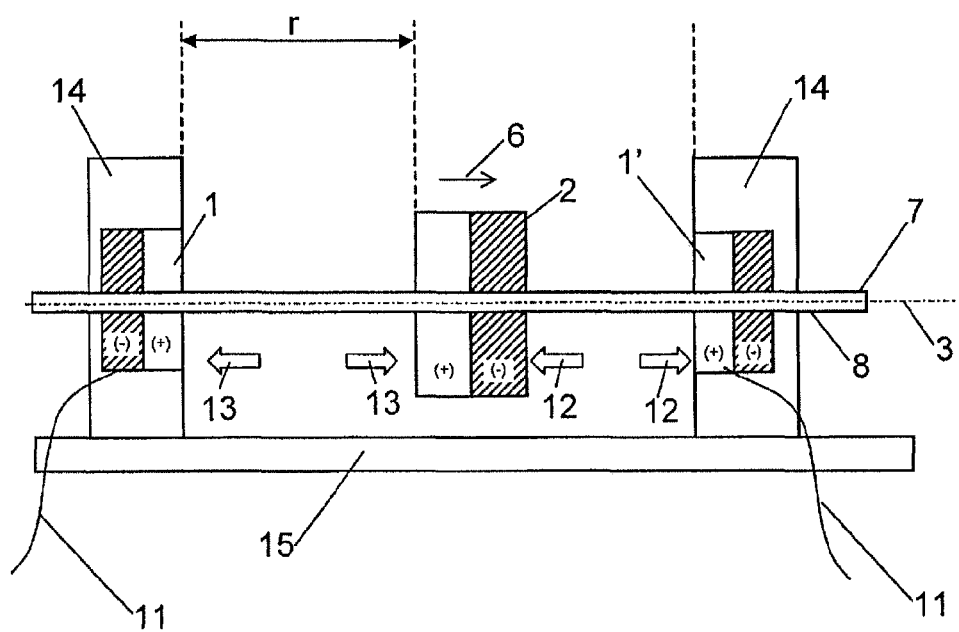

The FIGS. 4 and 5 show another embodiment of the magnetic device of the present invention as a magnetic drive.

Figure 1:
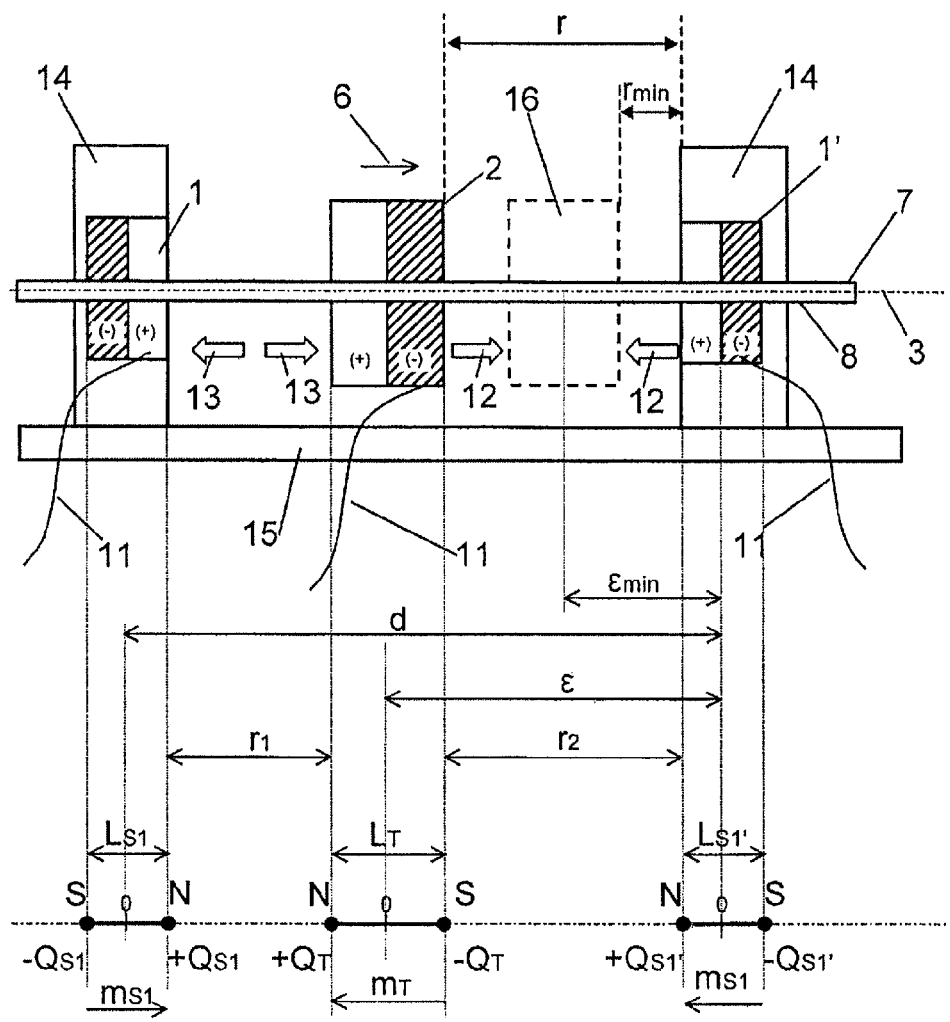
Figure 2:
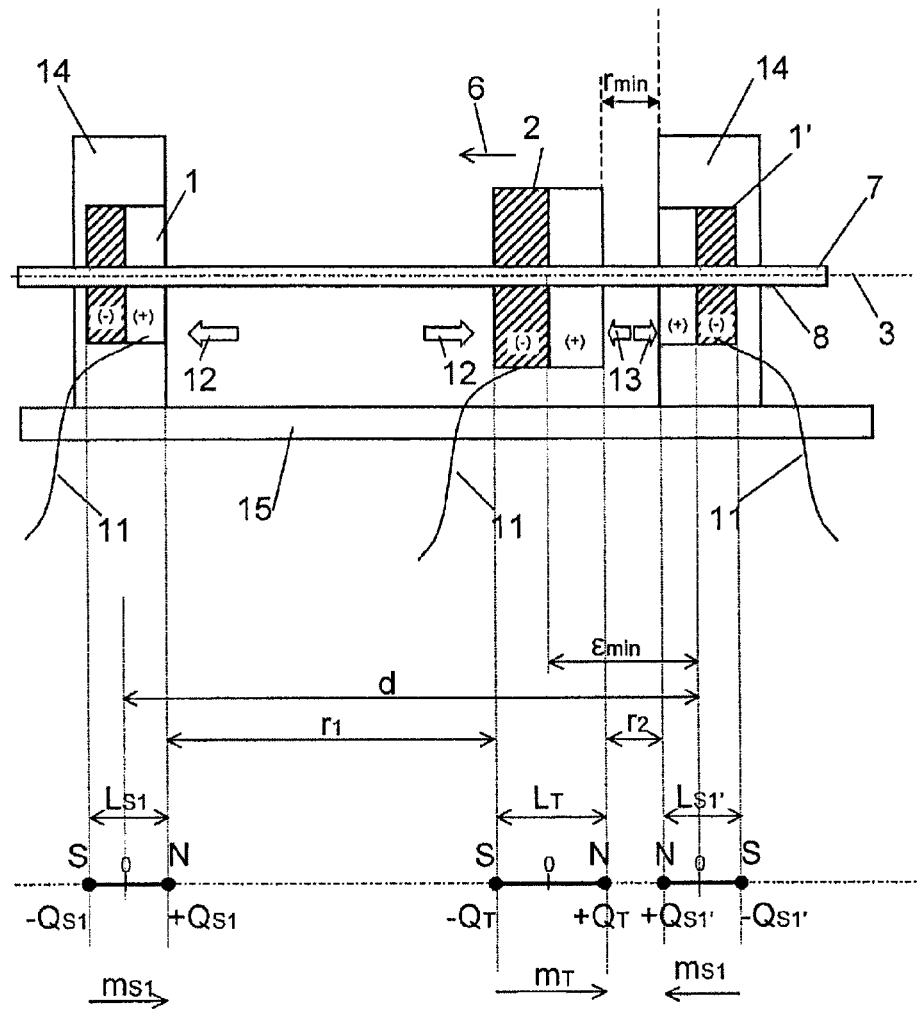
Figure 6:
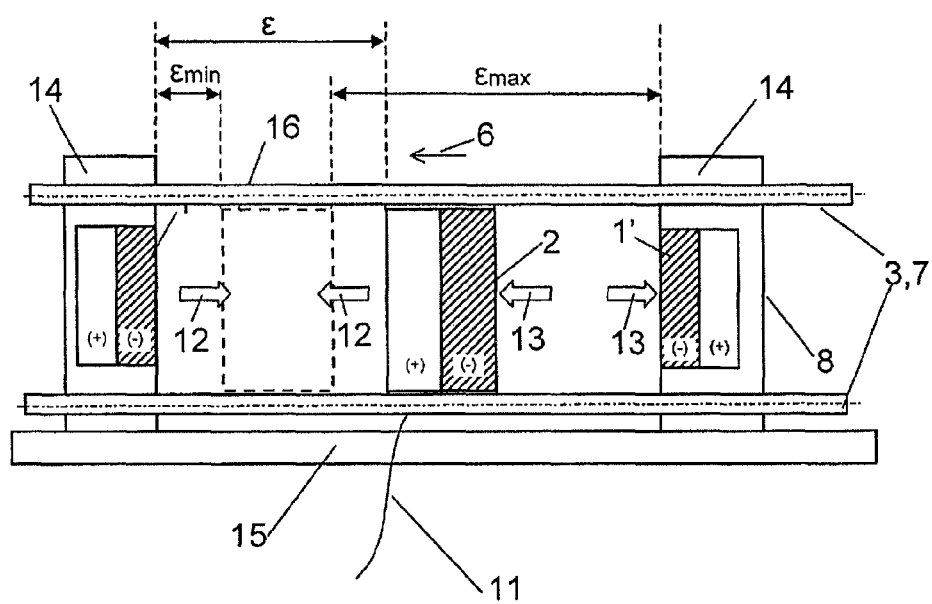

FIG. 6 shows another embodiment of the magnetic device of the present invention as a magnetic drive, which is similar to the embodiment represented in the FIGS. 1 and 2.

Figure 7:
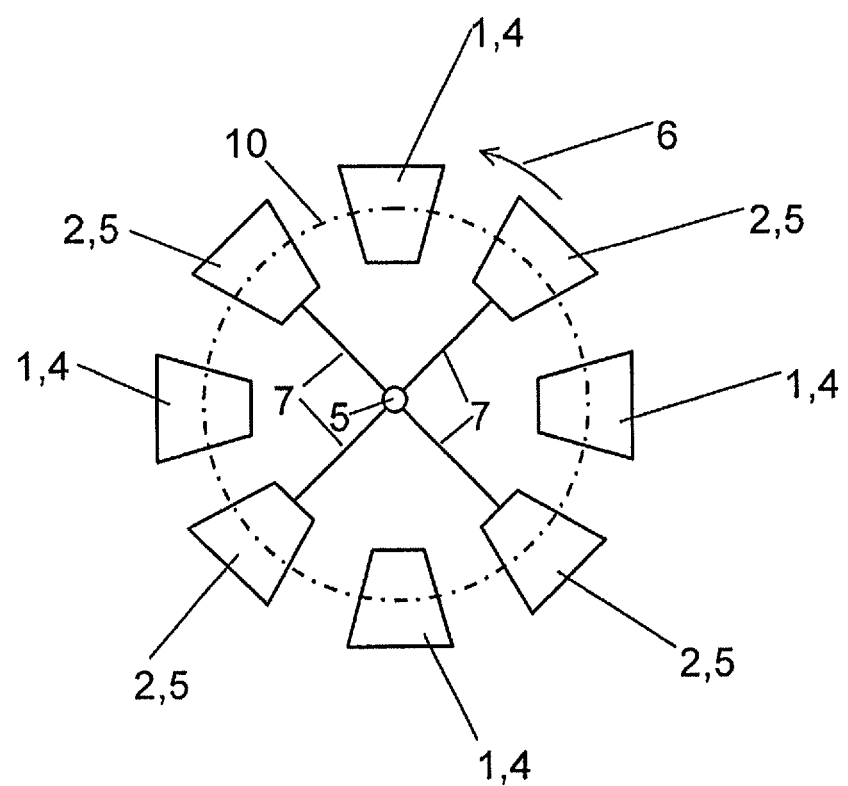

FIG. 7 shows another embodiment of the magnetic device of the present invention as a magnetic drive.

Figure 8:
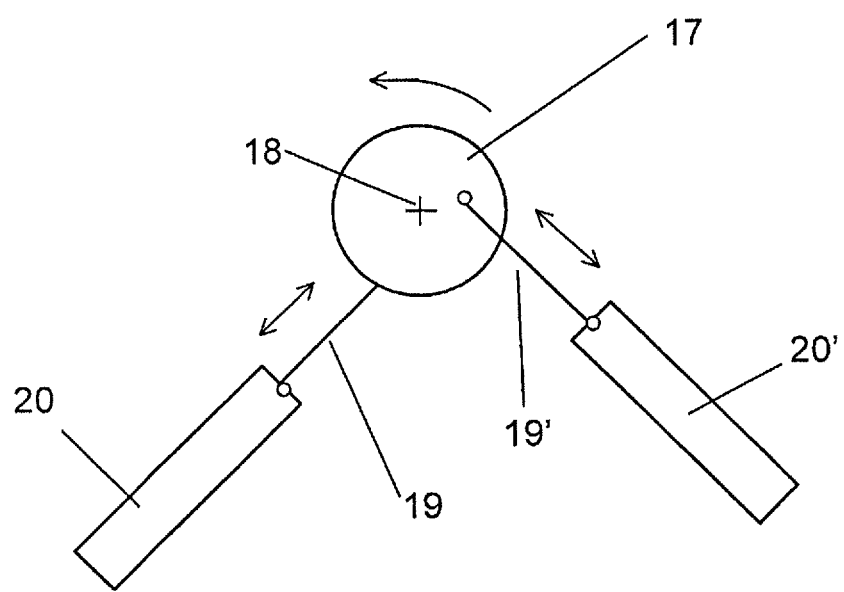

FIG. 8 illustrates a possible coupling of several magnetic drives by means of a shaft which is to be driven.

Figure 9:
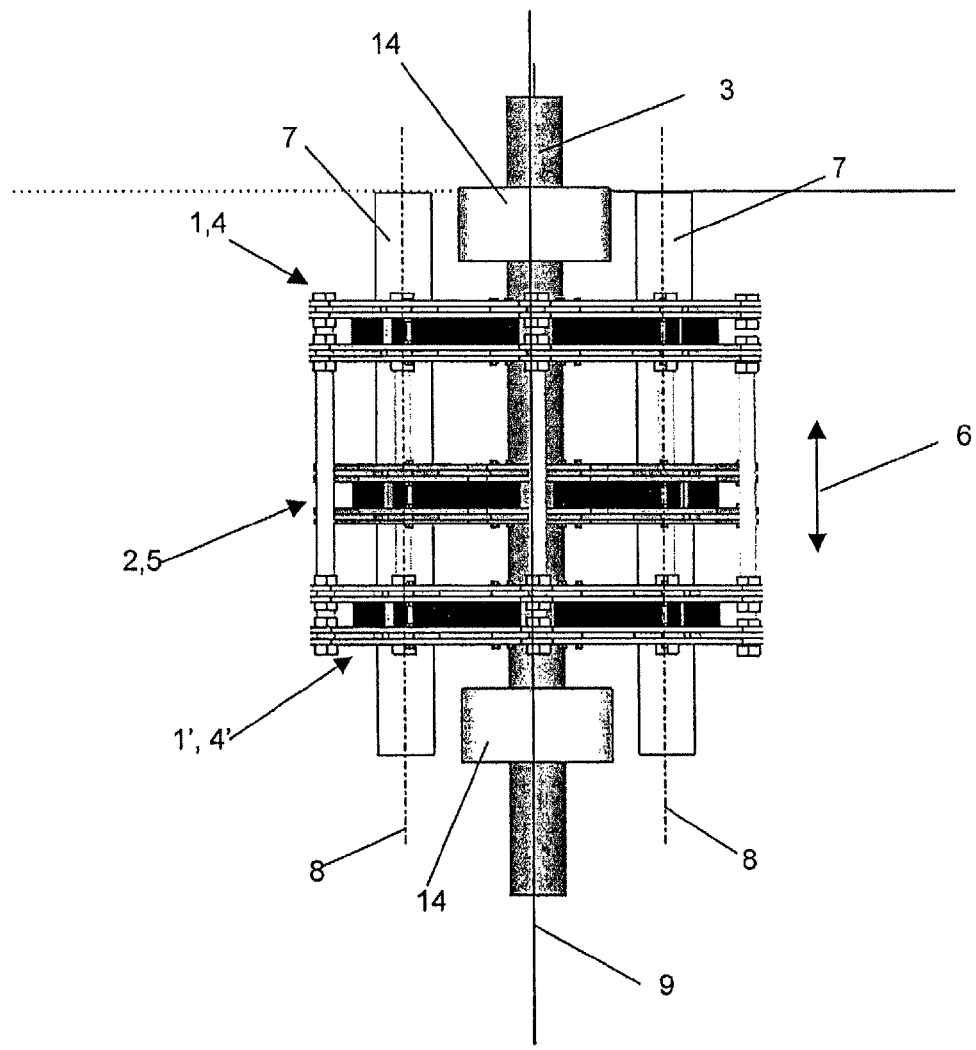
Figure 10:
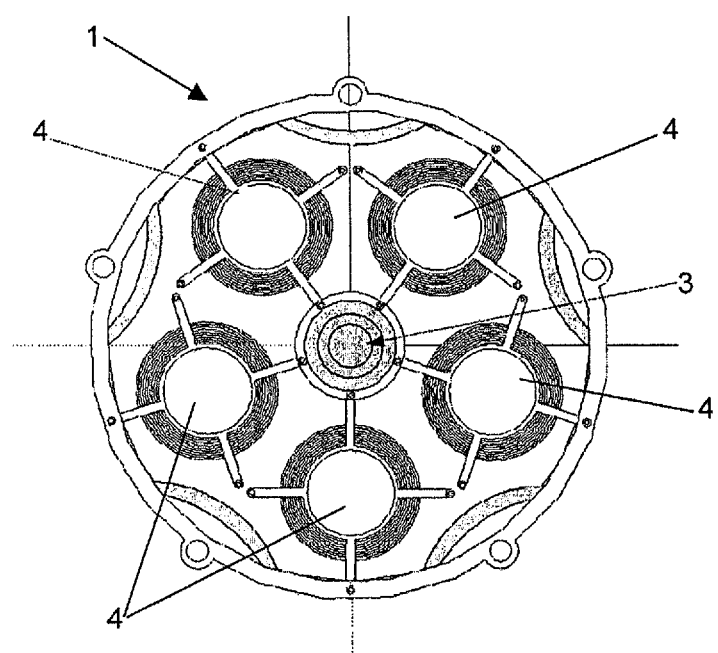
Figure 11:
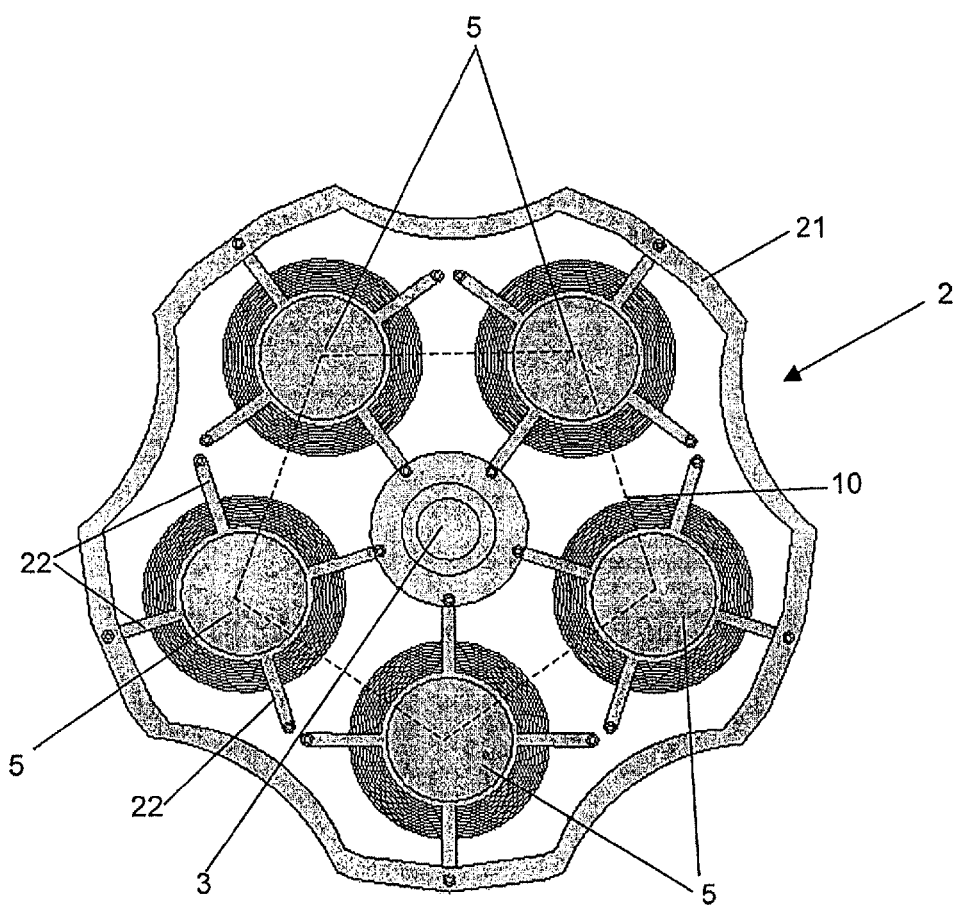

The FIGS. 9 to 11 show another embodiment of the magnetic device of the present invention as a magnetic drive.

Figure 12:
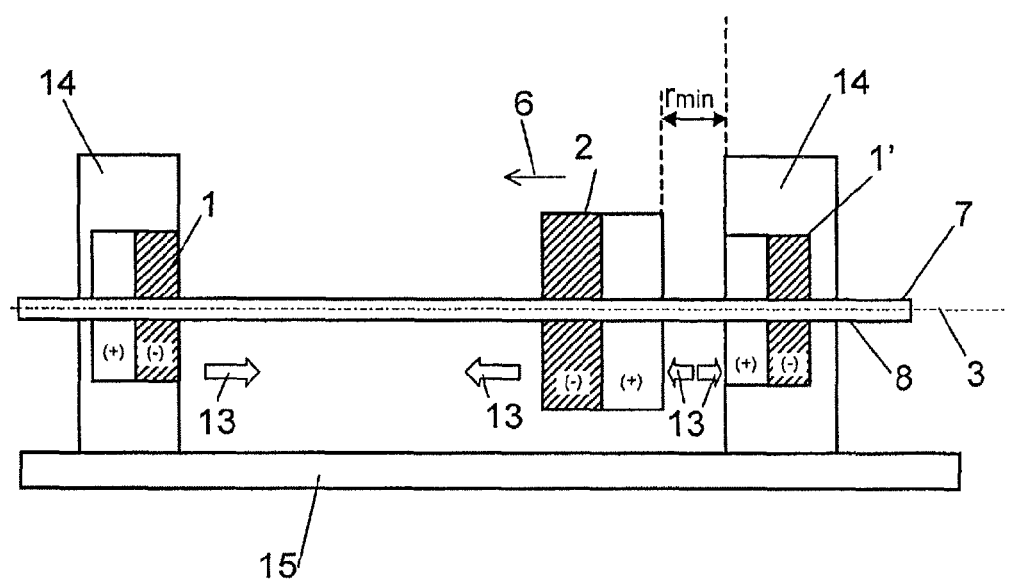

FIG. 12 shows another embodiment of the magnetic device of the present invention as a resistance element.

Figure 13:
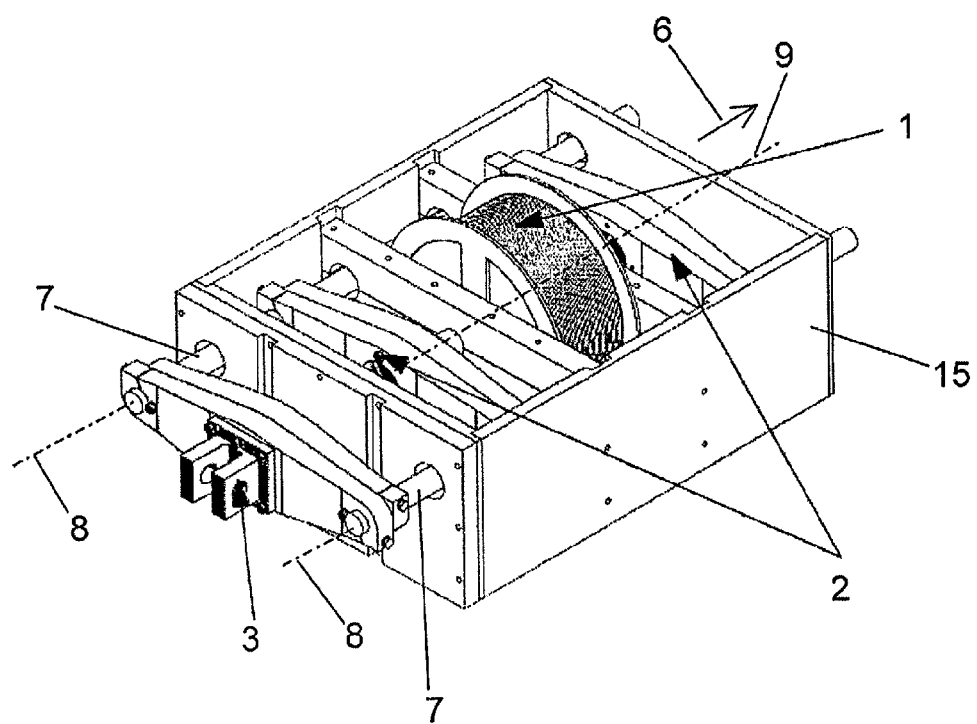

FIG. 13 shows an isometric view of another embodiment of the magnetic device of the present innovation.

Figure 14:
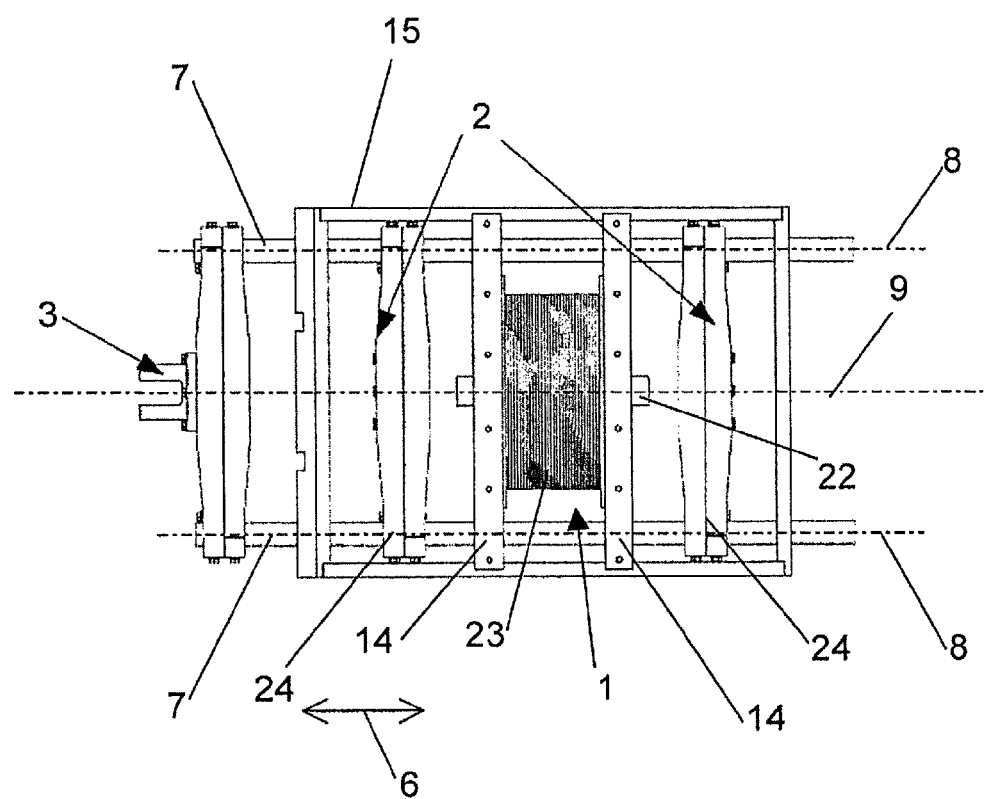

FIG. 14 shows a top view equal to an bottom view of the embodiment shown in FIG. 13.

Figure 15:
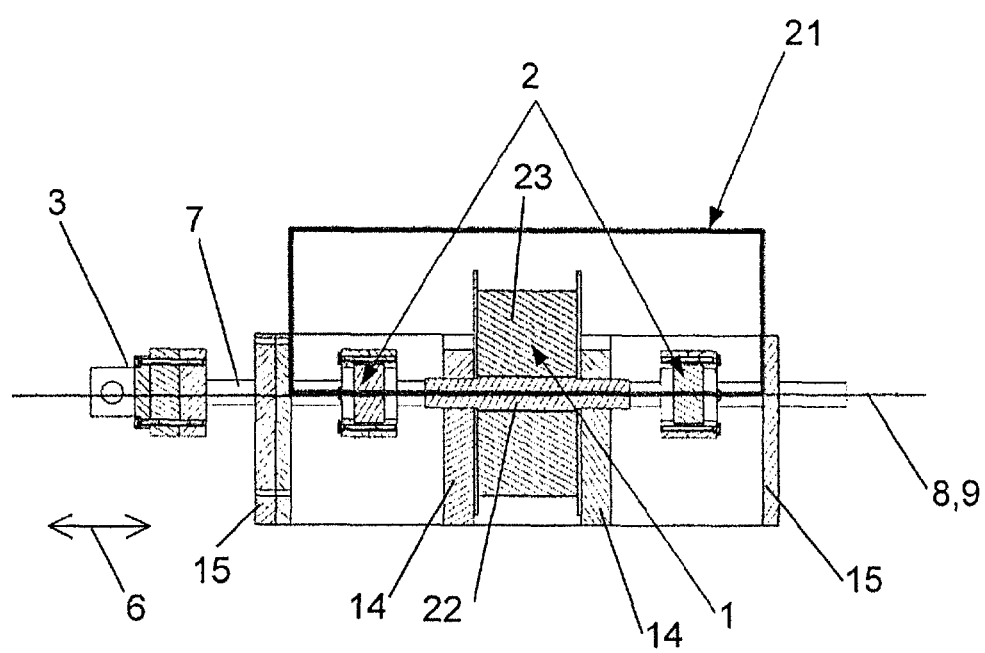

FIG. 15 shows a lateral cross-sectional view of the embodiment of the present innovation given in FIGS. 13-14.

Figure 16:
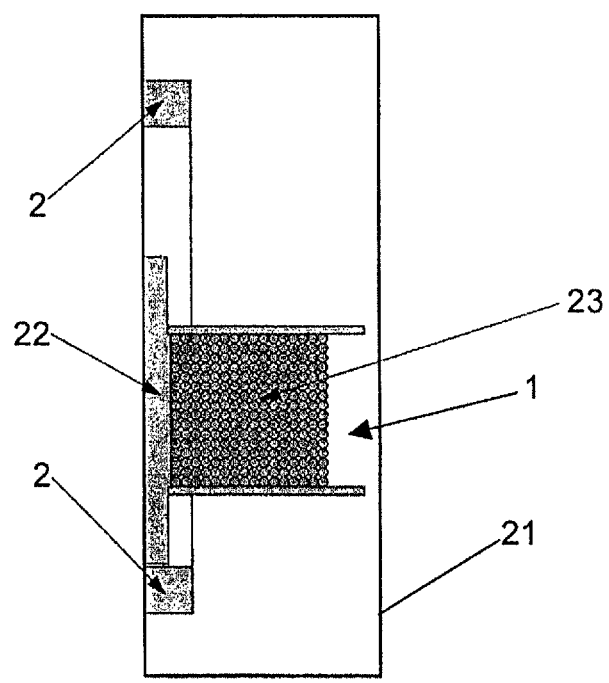

FIG. 16 shows the arrangement of the elements used for Finite Element Method simulation of the embodiment given in FIGS. 13-15.

Figure 17:
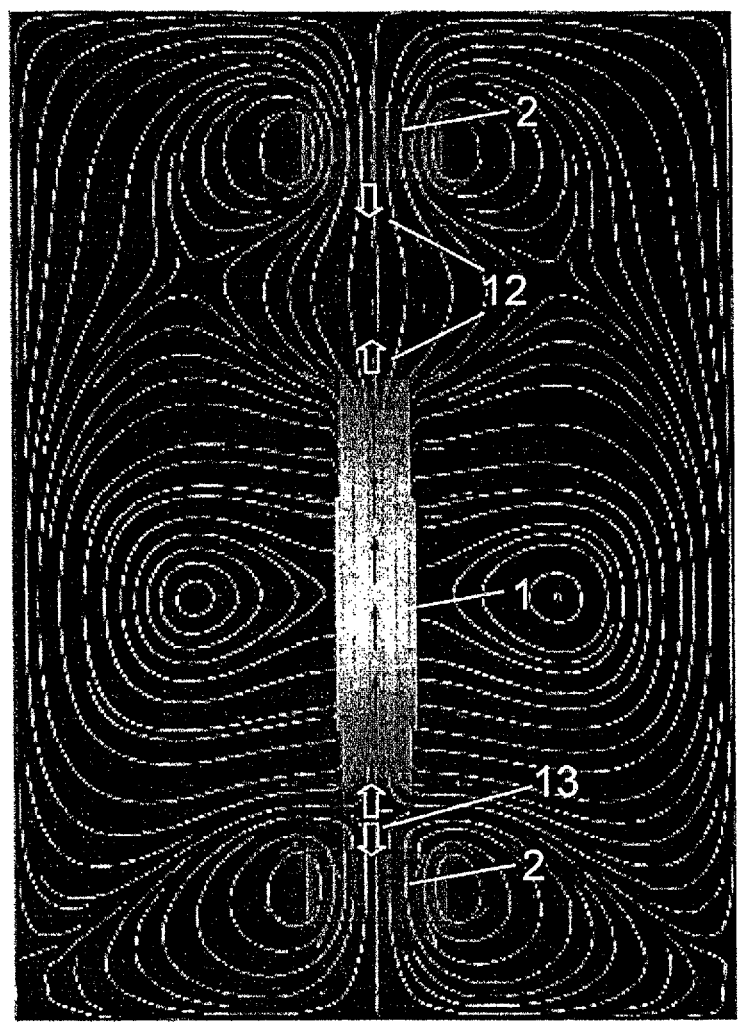
Figure 18:
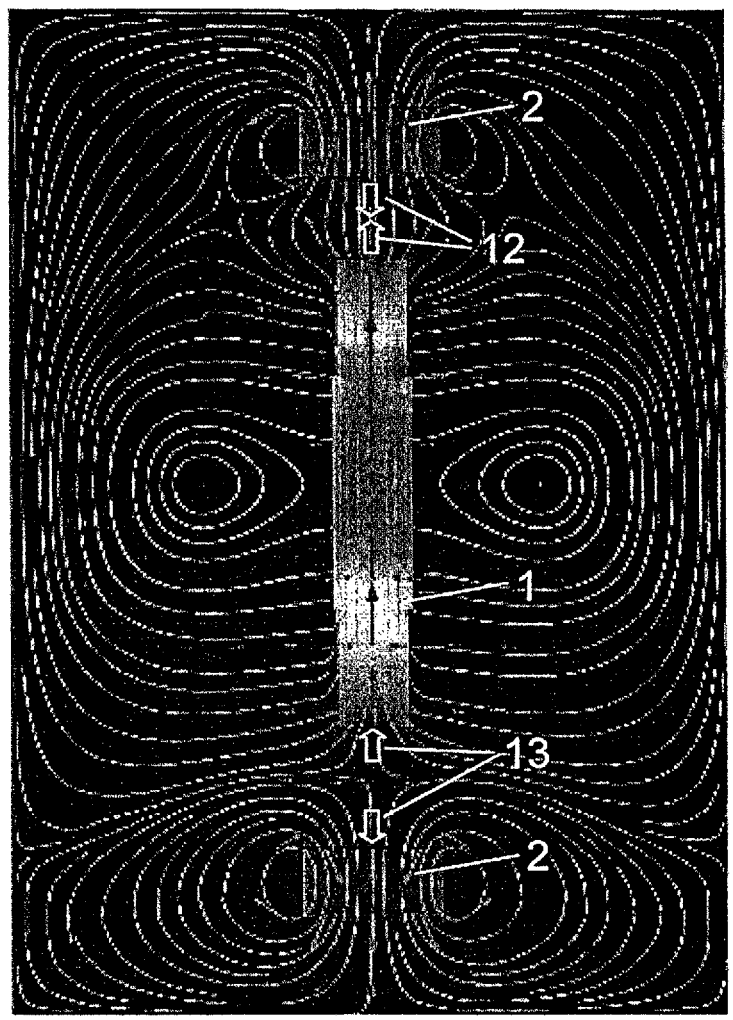

FIGS. 17-18 are about the results of Finite Element Method simulation.

Figure 19:
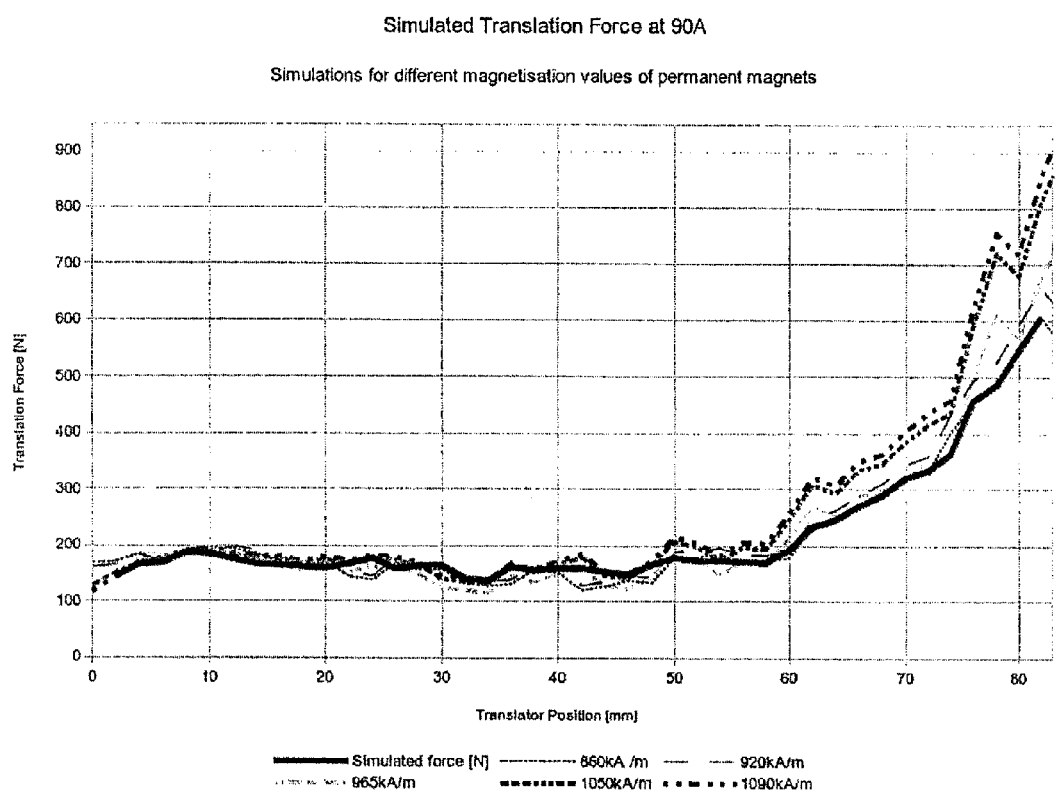
Figure 20:
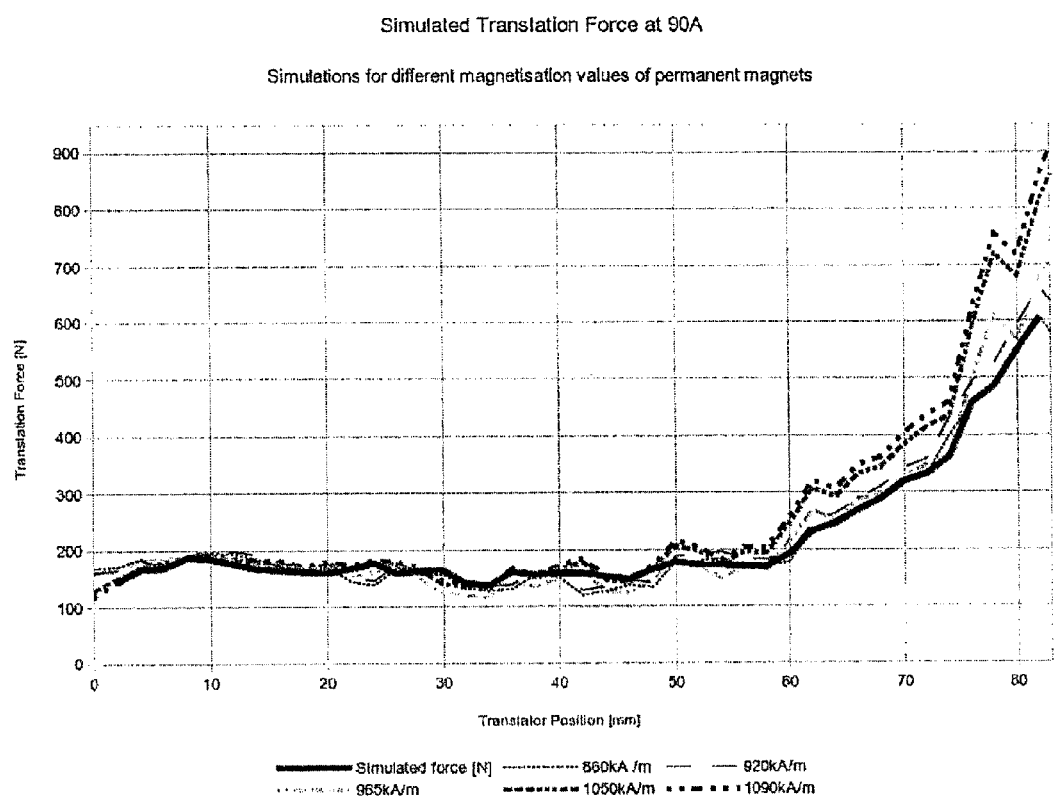

FIGS. 19-20 show diagrams concerning Finite Elemente Method simulation.

Possible applications of the magnetic device of the present invention include its use as magnetic drive, as generator, or as resistance device generating a force acting against an external force applied to it. In the case of its use as magnetic drive, the driving axle may perform mechanical work.

DETAILED DESCRIPTION

The FIGS. 1 and 2 show an embodiment of the magnetic device of the present invention as a magnetic drive 20 and all the variables used in the specification. The magnetic drive 20 comprises a translator 2 and stators 1, 1' which are disposed laterally in relation to the translator 2. The stators 1, 1' and the translator are electromagnets which are oriented along an axis—in the embodiment exemplarily shown in the FIGS. 1 and 2 along the driving axle of the translator 3. The dipolar moment of the stators 1, 1' and the translator 2 is parallel to said axis.

In order to provide for an alternating polarization of the translator 2, said translator 2 is connected to an a.c. power source (not represented) via a power cable 11, while each of the stators 1, 1' is connected to a d.c. source (not represented) via further power cables 11.

The polarization of the translator 2 is selected, so that the pole of the translator 2 facing the left stator 1 is polarized the same way as the closer pole of the left stator 1, which activates a repulsive force 13 between the left stator 1 and the translator 2; the pole of the translator 2 facing the right stator 1' is polarized differently from the closer pole of the right stator 1', which activates an attractive force 12 between the right stator 1' and the translator 2. The attractive 12 and repulsive 13 forces act on the translator 2 and cause a resulting force in a movement of the translator 2 in the translator moving direction 6, as illustrated in FIG. 1, from the left to the right side, the translator moving direction 6 being oriented towards the stator 1'. The movement of the translator 2 in the translator moving direction 6 after having changed the translator's 2 polarization is represented in FIG. 2.

When the magnetic drive 20 is in operation, the translator 2 always is positioned at a distance r of more than zero in relation to the stator 1. By means of this feature (see characterizing part of claim 1) any contact between the translator 2 and one of the stators 1, 1' when operating the magnetic drive 20 of the invention can be excluded. The distance r is defined as the distance between the pole end of the translator 2 and that of the respective stator 1, 1' which are facing each other.

In case of a linear movement of the translator 2 in the translator moving direction 6 to the left side, the translator 2 reaches the position 16. The position 16 is a final position of the linear movement of the translator 2 and is characterized in that the distance between translator 2 and the left stator 1 corresponds to the smallest defined distance $r_2$, while the distance between the translator and the right stator 1' corresponds to the greatest defined distance $r_1$. The distances $r_1$ and $r_2$ are defined in a way that, after a change of the translator's 2 polarization for carrying out a subsequent movement of the translator 2 from the right to the left side, as shown in FIG. 2, the repulsive force generated between the poles of the same sign of the translator 2 and the left stator 1 is of a maximum magnitude.

The distance r is preset by a control unit, said control unit changing the polarization of the translator 2 which is an electromagnet. If the translator 2 reaches the position 16, the poles of the translator 2' are changed, so that the translator 2 is moved in a moving direction opposite to the moving direction illustrated in FIG. 1. By changing the polarization of the stators 1, 1', repulsive forces are activated between the translator 2 and the left stator, while attractive forces are activated between the translator 2 and the right stator 1', said forces having a defined energy level, which causes the translator 2 to move from the right to the left side, as illustrated in FIG. 2.

The stator 1 is supported on a stator support 14 by means of a support construction 15.

The translator 2 is coupled to a driving axle 3, which also serves as a guiding unit 7 for the translator 2 in the embodiment illustrated in FIG. 1. The guiding axle 8 of the guiding unit 7 is parallel to the translator's moving direction 6. The guiding axle 8 extends through the stators 1, 1' and through the translator 2, the respective magnetic fields of the stators 1, 1' and the translator 2 not being disturbed by the presence of the guiding axle 8.

The volume between the stators 1, 1' is a vacuum. To achieve said vacuum, the magnetic drive 20 is disposed within a housing (not represented).

Figure 3A:
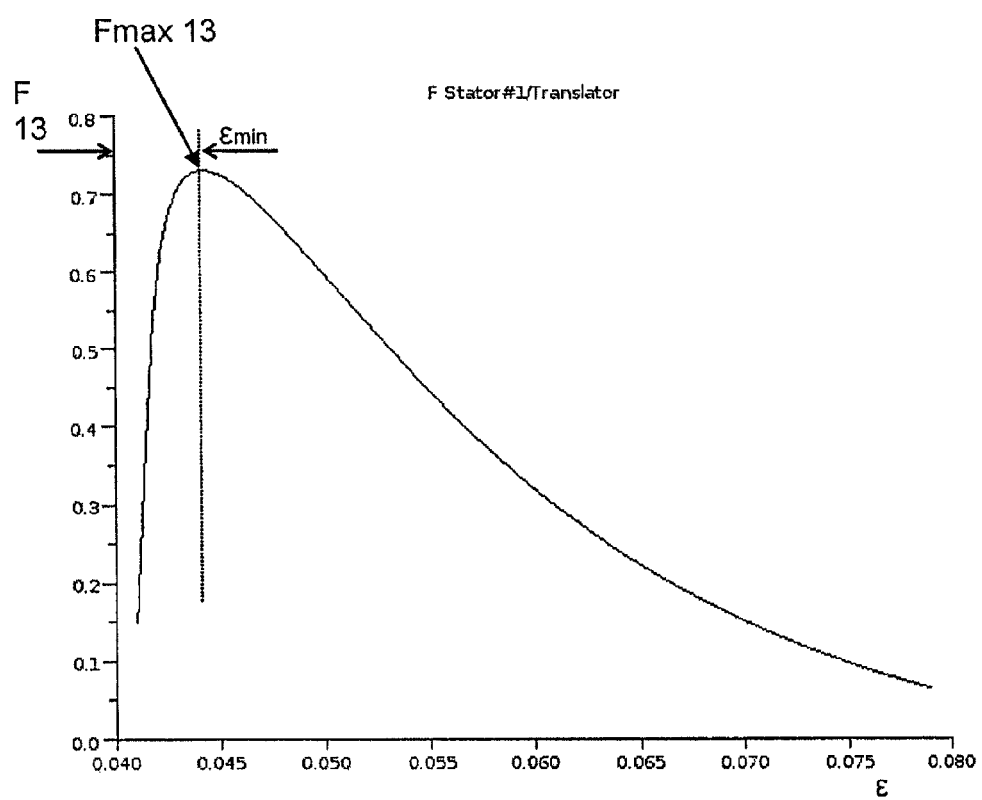

The graph disclosed in FIG. 3a shows the dependence of the repulsive force 13 between the translator 2 and the left stator 1, when the translator 2 moves as illustrated in FIG. 1. In FIG. 3a as well as in the FIGS. 3b and 3c, the distance of the translator 2 from the respective stator 1, 1' is indicated on the x-axis, while the force acting between the translator 2 and the stator 1, 1' is indicated on the y-axis. The graphs disclosed in the FIGS. 3a, 3b, and 3c constitute the basis for a calculation based on the equations disclosed in the specification and the following assumptions:

$$\mu_{Rs1} = \mu_{Rs2} = \mu_{Rt} = 100$$

$$N_{s1} = N_{s2} = N_t = 40$$

$$R_{s1} = R_{s2} = R_t = 0.02 \text{ m}$$

$$L_{s1} = L_{s2} = L_t = 0.04 \text{ m}$$

$$I_{s1} = I_{s2} = I_t = 1 \text{ A}$$

the translator run is $\delta = 0.04$ m

At a position $X_t = 0.04$ m, the translator 2 would contact the left stator 1. The y-value of the graph in FIG. 3a comes ever closer to reaching 0. The repulsive force 13 reaches its maximum at a distance $\epsilon$. The position 16 of the translator 2 is preferably chosen by the guiding unit in a way that the zero point of the translator 2 is spaced apart by a distance $\epsilon_{min}$ from the zero point of the adjacent stator 1, 1'.

The graph in FIG. 3b shows the attractive force's 13 dependence on the distance between the translator 2 and the right stator 1' according to the representation in FIG. 1. Generally, the attractive force 13 increases when the translator 2 comes increasingly closer to the right stator 1'.

Figure 3C:
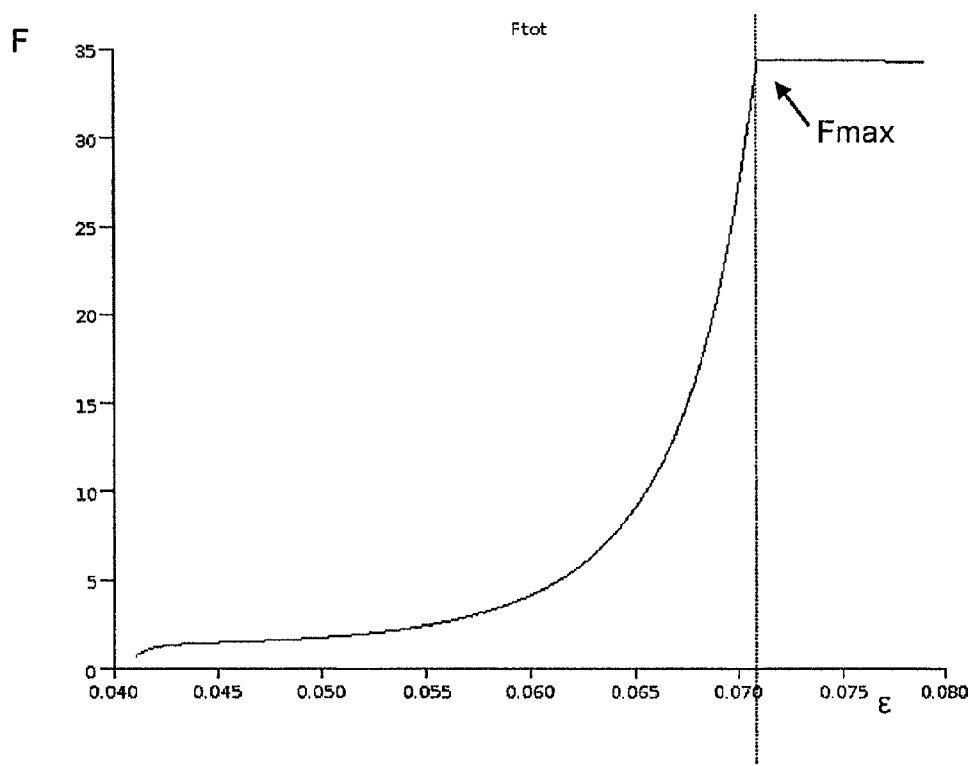

FIG. 3c shows the graph resulting from the graphs in the FIGS. 3a and 3b. The graph in FIG. 3c shows the force condition resulting from the development of the repulsive force 13 and the attractive force 12, depending on the position of the translator 2 between the stators 1, 1', the resulting force condition being parallel to the axis, referring to FIGS. 1 and 2 parallel to the axis of movement 3.

The FIGS. 4 and 5 show another embodiment of the magnetic device of the invention as a magnetic drive 20, said embodiment being similar to that illustrated in the FIGS. 1 and 2. In contrast to the embodiment represented in FIG. 2, in said further embodiment shown in FIG. 3, the polarization of the translator 2 remains the same during the translator's 2 movement, while the polarization of the stators 1, 1' is changed.

FIG. 6 shows an embodiment similar to the embodiment illustrated in FIG. 4, said embodiment comprising two guiding units, in contrast to the embodiment shown in FIG. 4. The magnetic field acting between the stators 1, 1' and the translator 2 is not disturbed by the guiding unit 7, which constitutes an advantage compared to the embodiment shown in FIG. 4.

FIG. 7 shows another embodiment of the magnetic drive 20 of the invention, the movement of the translator 2 being rotary. The magnetic drive 20 comprises four segment-shaped, individual translator magnets 5 which are disposed in a circle 10 around a driving axle 3 and a translator axis of rotation and at a right angle thereto. The individual translator magnets 5 are mechanically coupled to the driving axle 3 via guiding units, so that said individual translator magnets 5 form a translator 2. In the areas between the individual translator magnets 4 four, equally segment-shaped, individual stator magnets 4 are disposed, said individual stator magnets 4 being coupled to form a stator 1 by means of a mechanical coupling (not represented).

According to the above disclosure, the poles of the individual stator magnets 4 and the individual translator magnets 5 facing each other are of the same or of different signs.

If the translator's 2 movement is rotary, the translator will always be spaced apart from the stator when the magnetic drive 20 is in operation, the rotary moving direction 6 of an individual translator magnet 5 always being oriented towards an individual stator magnet 4.

FIG. 8 shows the coupling of a first magnetic drive 20 of the invention to another magnetic drive 20' of the invention. The mechanical coupling of the magnetic drives 20, 20' is achieved via a disc 17 which is supported to rotate around a disc center 18. For geometrical reasons, a rod 19 is provided between the disc 17 and each of the magnetic drives 20, 20', one end of said rod being connected to the disc 17 at an eccentric position in relation to the disc center 18, its other end being hinged to the respective magnetic drive 20, 20'.

The magnet drives 20, 20' are mounted in fixed positions in relation to the disc center 18, so that the linear movement generated by the magnetic drives 20, 20' creates a rotary movement of the disc 17. By arranging the rod 19, 19' at an eccentric position, the linear movement of the translator 2 (not shown in FIG. 8) of the magnetic drive 20, 20' is mechanically controlled.

The FIGS. 9 to 11 show views of an embodiment of the magnetic drive which is characterized by several individual stator magnets 4 being arranged at the stator 1, 1' and by several individual translator magnets 5 being arranged at the translator 2, and detailed views of the translator 2 and the stator 1, 1'.

FIG. 9 shows the embodiment of the magnetic drive illustrated in the FIGS. 9 to 11 from above. The magnetic drive comprises two stators 1, 1' disposed along an axis 9. Moreover, two guiding units 7 are arranged, said guiding unit 7 supporting the translator between the stators 1, 1' so that it may be moved in relation to said stators 1, 1'. The translator 2 is further coupled to a driving axle 3 extending through the stators 1, 1' to a driving element (not represented). The support construction 15 also serves as a support for the driving axle.

FIG. 10 shows a lateral view of the stator 1 of the embodiment of the magnetic drive of the invention shown in the FIGS. 9 to 11. The stator 1 comprises five individual stator magnets 4 which are disposed rotationally symmetrically around the driving axle 3. Each of the individual stator magnets 4 is disposed opposite the individual translator magnets 5.

FIG. 11 shows a lateral view of the translator 2. The translator 2 comprises several individual translator magnets 5 which are disposed rotationally symmetrically around the driving axle 3, which is perpendicular to the view plane, along a polygon 10. The individual translator magnets 5, on the one hand, are disposed at the driving axle, and, on the other hand, at a translator support 21 by means of translator bearings 22. The translator bearings 22 are webs, each having as small a cross-sectional area as possible.

FIG. 12 shows another embodiment of the magnetic drive of the invention as a resistance element. Basically, the construction is similar to that of the above-described embodiments, the stators 1, 1', however, being polarized in relation to the translator 2 in a way that repulsive forces 13 between the poles of the translator 2 and those of the stators 1, 1' are activated. The translator 2 may, thus, be displaced along a distance between the stators 1, 1', when it is accelerated by a force acting on it via the driving axle 3.

FIG. 13 shows an isometric view of another embodiment of the magnetic device of the invention. The magnetic device comprises a stator 1 disposed between two translators 2, said stator 1 and translators 2 being disposed within a support structure 15 which forms a housing. The driving axle 3 is located outside said support structure. The stator 1 and the translators 2 are disposed along the axis 9 which determines the direction 6 of the translators' movement.

The translators 2 are mounted on and supported by two guiding units 7, the guiding axles 8 being oriented parallel to the translators' moving direction 6. The guiding units 8 are disposed laterally in relation to the translators 2 in order not to interfere with the magnetic field between the translators 2 and the stators 1.

The guiding units 8 are supported by the support structure 15.

The magnetic device shown in FIG. 13 essentially has those of the above-mentioned characteristics which are suitable. The translators 2 are N45 grade magnets. The stator 1 is an electromagnet comprising a magnetic core 22 and a coil 23 wound around said core 22.

FIG. 14 shows a top view, corresponding to the bottom view, of the magnetic device of the invention shown in FIG. 13. The characteristics of the device described referring to FIG. 13 can essentially be seen in FIG. 14.

In FIG. 14, the positions of the translators 2 and the stator 1 and the driving axle 3 along the axis 9 can be seen.

The stator 1 is mounted to the support structure 15 by means of a stator support 14. The core 22 of the stator 1 extends in the direction of the axis 9, projecting from the support structure 15, so that the magnetic field between the stator 1 and the translators 2 is not interfered with by the stator support 14.

The shape of the translator support 24, by means of which the translators 2 are mounted to the guiding unit 7, is adapted to the momentum strain, evident for those of skill in the art, and the oscillation forces caused, amongst other things, by the oscillating movement of the translators 2.

FIG. 15 shows a sectional view of the magnetic device shown in the FIGS. 13 and 14. In addition to the above-mentioned characteristics, a calculation area 21 can be seen; for this area, a magnetic field strength curve was determined using the Finite Elements Method (FEM). In order to make calculations easier, the calculation area 21 only covers one symmetric half; the axis of symmetry in FIG. 15 corresponds to the axis 9. The results of the FEM calculation (see FIGS. 17 and 18) will be discussed in the paragraphs below.

FIG. 16 shows a detailed view of the symmetric half for which FEM calculations were carried out. The axis of symmetry again corresponds to the axis 9. The symmetric halves of the translators 2 can be seen in FIG. 16.

The stator 1 comprises a core 22 and a coil 23; again, the respective symmetric halves can be seen.

In FIG. 16, another calculation area 21 is shown.

In FIGS. 17 and 18 the results of the FEM simulation are illustrated. The FEM calculation is based on the assumption that the stator is an electromagnet of 90 A and that the translators 2 are N45 grade permanent magnets of 1,050 kA/m.

In FIG. 17, the distance r between the position of the translator 2 and the stator is 1.00 mm. The repulsive force 13 between the stator 1 and the translator 2 constitutes a great part of the translation force acting on the translator 2, while the movement of the translator 2' is caused by the attractive force 12 between the translator 2' and the stator 1.

FIG. 18 shows the results of the FEM simulation when the translators 2 are positioned at equal distances from the stator 1.

FIG. 19 shows a graph which compares the translation force measured in the trial device to the translation force calculated based on an FEM simulation. In both cases, the contemplated translators were permanent magnets of 1,050.0 kA/m. For the calculations, the stator was supplied with an energy of 90 A. For the simulation, the stator was supplied with an energy of 9 A, and the obtained values were extrapolated for 90 A.

The graph shown in FIG. 19 clearly shows that the simulation based on the above discussed theories and the measurements are essentially consistent.

FIG. 20 compares the translation forces of translators which are differently magnetized permanent magnets, said translation forces being calculated by means of an FEM simulation based on the above discussed theory. The graph's y-axis shows the calculated values of the translation force, while the x-axis shows the translator's position. The graph in FIG. 20 shows the influence of the magnetization of the permanent magnets used as, translators, when the stators are supplied with an energy of 9 A, extrapolated for 90 A. The graph includes the curve "Simulated force [N]", which shows the general course of the other curves. The curve "Simulated force [N]" is also included in FIG. 19.

What is claimed is:

1. A magnetic device comprising at least one stator and at least one translator, said translator being movable in relation to said stator in a translator moving direction, said translator moving direction being oriented towards said stator, said at least one stator and said translator being arranged along an axis, wherein said magnetic device comprises a control device, said control device comprising a device for controlling a distance r>0 between the translator and the stator in relation to the force generated between the stator and the translator when said magnetic device is in operation, r being equal to or greater than 0, said translator being movable in relation to said stator in the translator moving direction along a linear translator movement axis, said at least one stator and said translator being oriented along said translator moving axis, wherein the minimum distance r is defined by a controlling unit based on the force created between the stator and the translator, so that a force acting on the translator at a Position $X_t$ of the translator is a maximum force, the force acting on the translator being defined by the following relation:

$$F_{translator}(X_t) = \frac{\mu_0}{4\pi} \left\{ \left\{ \frac{q_{s1a}(X_t)q_{tb}(X_t)}{\left(X_t + \frac{L_s+L_t}{2}\right)^2} + \frac{q_{s1a}(X_t)q_{tb}(X_t)}{\left(X_t - \frac{L_s+L_t}{2}\right)^2} \right\} - \left\{ + \frac{q_{s1a}(X_t)q_{tb}(X_t)}{\left(X_t + \frac{L_t-L_s}{2}\right)^2} + \frac{q_{s1a}(X_t)q_{sb}(X_t)}{\left(X_t + \frac{L_t-L_s}{2}\right)^2} \right\} \right\}$$

wherein $q_{s1a}(X_t)$ and $q_{s1b}(X_t)$ are the magnetic pole strengths of the stators, $q_{ta}(X_t)$ and $q_{tb}(X_t)$ are the magnetic pole strengths of the translator, $$X_t \in ]\frac{L_s+L_t}{2}; \delta + \frac{L_s+L_t}{2}[$$

is the translator's position $X_t$, $L_s$ is the length of the stators, $L_t$ is the length of the translator.

2. The magnetic device according to claim 1, wherein individual stator magnets at the stator and/or individual translator magnets at the translator are arranged along a line describing a polygon around a polygon axis which is oriented in parallel to the translator's moving direction.

3. The magnetic device according to claim 1, wherein the translator is mounted movably in relation to the stator by means of at least one guiding unit, a guiding axle of the guiding unit intersecting the stator, in an area between two adjacent individual stator magnets, and the translator, in an area between two adjacent individual translator magnets.

4. The magnetic device according to claim 1, wherein the translator's movement in relation to the stator is an oscillating movement.

5. The magnetic device according to claim 1, wherein the stator is a permanent magnet, while the translator is an electromagnet.

6. The magnetic device according claim 1, wherein the stator is an electromagnet, while the translator is a permanent magnet.

7. The magnetic device according to claim 1, wherein the stator and the translator are permanent magnets or electromagnets.

8. The magnetic device according to claim 1, wherein the control device comprises a spacer element which may be positioned between the stator and the translator.

9. The magnetic device according to claim 1, wherein the control device comprises a system exercising a mechanical constraint on the translator's movement.

10. The magnetic device according to claim 1, wherein the control device comprises a distance measuring device and/or time measuring device, by means of which the polarization of the stator and/or the translator and/or the field strength of the stator and/or the translator may be changed depending on the position of the translator in relation to the stator and/or depending on a period of time.

11. The magnetic device according to claim 1, wherein a volume extending between the stator and the translator, when the translator is situated at the furthest distance d from the stator, is a vacuum.

* * * * *